United States Patent [19]
Murata et al.

[11] Patent Number: 5,720,021
[45] Date of Patent: Feb. 17, 1998

[54] IMAGE PROCESSING APPARATUS FOR STORING IMAGE DATA TO A PAGE MEMORY

[75] Inventors: Kazuyuki Murata, Kyoto; Akio Kojima, Neyagawa; Yasuhiro Kuwahara, Osaka; Naoki Takahashi, Katano, all of Japan

[73] Assignee: Matsushita Electric Industrial Co., Ltd., Osaka, Japan

[21] Appl. No.: 596,621

[22] Filed: Feb. 5, 1996

[30] Foreign Application Priority Data

Feb. 6, 1995 [JP] Japan ................................. 7-017961

[51] Int. Cl.$^6$ .................................................. G06F 15/00
[52] U.S. Cl. ............................................................ 395/138
[58] Field of Search ................................. 395/138, 133, 395/128, 129; 345/112, 118

[56] References Cited

U.S. PATENT DOCUMENTS 5,459,825  10/1995  Anderson et al. .................. 395/133

*Primary Examiner*—Phu K. Nguyen
*Attorney, Agent, or Firm*—Beveridge, DeGrandi, Weilacher & Young LLP

[57] ABSTRACT

When read image data is mapped outside the range of a page memory, the invention allows a coordinate value to be stored in the page memory to be mapped after being shifted into the page memory, thereby allowing efficient utilization of the page memory, and in order to achieve the above-described object, the invention employs the configuration that when an integral number coordinate value ($X_{int}$, $Y_{int}$) is out of the range of an image memory, an X-coordinate conversion circuit and a Y-coordinate conversion circuit shift the coordinate value so that it comes in the range and outputs a coordinate value (XINT, YINT) and this shifting process allows read image data outside the image memory to be shifted into the area of the image memory to be stored therein and when image data stored in the image memory is read out, the coordinate is read out in reverse on the assumption that a shifted origin coordinate O ($X_{smin}$, $Y_{smin}$) serves as the coordinate origin of the image memory and the origin coordinate O ($X_{smin}$, $Y_{smin}$) is automatically stored in a register when the reading of the image is completed.

19 Claims, 21 Drawing Sheets

IMAGE PROCESSING APPARATUS FOR STORING IMAGE DATA TO A PAGE MEMORY

BACKGROUND OF THE INVENTION

1. Field of the Invention

The present invention relates to an image processing apparatus for mapping and storing image data obtained by scanning an original image into a page memory based on data on scanning positions.

2. Description of the Related Art

Inventors have proposed an apparatus which reads an image using a hand-held scanner having two wheels rotating independently of each other and maps the read image into a memory based on the distances traveled by the two wheels (see Japanese Patent Application No. H6-187474).

The above-described image processing apparatus stores image data read by the hand-held scanner into a memory as follows.

The coordinate value of each pixel in the read image data is calculated from the travel distances of the two wheels. The coordinate value is then converted into an address in an image memory (page memory) where the pixel data is to be stored. The pixel data is stored in the image memory address obtained by the conversion.

Hereinafter, the operation of storing read image data into a predetermined address in an image memory is referred to as mapping.

A description will be made with reference to FIG. 13 on a problem with the above-described method of storing image data into an image memory. A read start position of the hand-held scanner in a page memory (image memory) must be determined in advance. A page memory 1301 has a size of Nx pixels in the X-direction and Ny pixels in the Y-direction. Assume that the read start position of the hand-held scanner is H–H'. Then, when the hand-held scanner is manually scanned in the course indicated in FIG. 13 which starts in the position H–H', passes through a position I–I' and ends in a position J–J', read areas p and q which are out of the page memory area and can not be stored in the page memory in spite of the fact that the area in which image reading is performed is smaller than the size of the page memory.

As described above, there has been a problem in that a track drawn by manual scanning does not allow efficient utilization of the capacity (area) of a page memory.

SUMMARY OF THE INVENTION

To solve the above-described problems, the image processing apparatus of the present invention is characterized by that an image processing apparatus to which image data read by scanning an original image and scanning position data corresponding to said image data is input and which stores said image data in a page memory having a size of Nx pixels in an X-direction and Ny pixels in a Y-direction comprises:

a means for calculating a coordinate value of each pixel in said image data in the coordinate system of said original;

a conversion means for converting said calculated coordinate value into a coordinate value ($X_{int}$, $Y_{int}$) on a pixel-by-pixel basis in said page memory;

a first determination means for determining whether said coordinate value $X_{int}$ is within a first coordinate range $0 \leq X < Nx$ which can be stored in said page memory;

a second determination means for determining whether said coordinate value $Y_{int}$ is within a second coordinate range $0 \leq Y < Ny$ which can be stored in said page memory;

an X-coordinate conversion means for shifting said coordinate value $X_{int}$ so that it will come in said first coordinate range and for outputting the shifted coordinate value as Xp if said first determination means determines that said coordinate value $X_{int}$ is out of said first coordinate range and for outputting said coordinate value $X_{int}$ as it is without shifting as $X_{int}$ if said first determination means determines that said coordinate value $X_{int}$ is within said first coordinate range; and a Y-coordinate conversion means for shifting said coordinate value $Y_{int}$ so that it will come in said second coordinate range and for outputting the shifted coordinate value as Yp if said second determination means determines that said coordinate value $Y_{int}$ is out of said second coordinate range and for outputting said coordinate value $Y_{int}$ as it is without shifting as $Y_{int}$ if said second determination means determines that said coordinate value $Y_{int}$ is within said second coordinate range.

Further, in addition to the above-described configuration, the image processing apparatus of the present invention comprises a register for holding a minimum value $X_{smin}$ of said coordinate value Xp when said coordinate value $X_{int}$ is a negative value;

a register for holding a minimum value $Y_{smin}$ of said coordinate value Yp when said coordinate value $Y_{int}$ is a negative value; and a coordinate conversion means for shifting a read coordinate value (Xr, Yr) specified for readout from said page memory by said minimum value ($X_{smin}$, $Y_{smin}$) and converts it into a coordinate value (Xu, Yu) in said page memory.

The above-described configuration makes it possible to map a coordinate value to be mapped to a page memory after shifting it into the page memory in such a case wherein read image data is otherwise mapped to an area outside the range of a page memory. This allows efficient utilization of a page memory.

Further, when an image stored in a page memory is read out, the reading is carried out by shifting the read coordinate value in the page memory in reverse. Thus, an unshifted correct image can be read from the page memory.

BRIEF DESCRIPTION OF THE DRAWINGS

FIGS. 10A–10B is a schematic view showing pixel density conversion.

FIGS. 12A–12C is a schematic view showing an operation of mapping high density image data 500 to the image memory 6.

DESCRIPTION OF THE PREFERRED EMBODIMENTS

Figure 1:
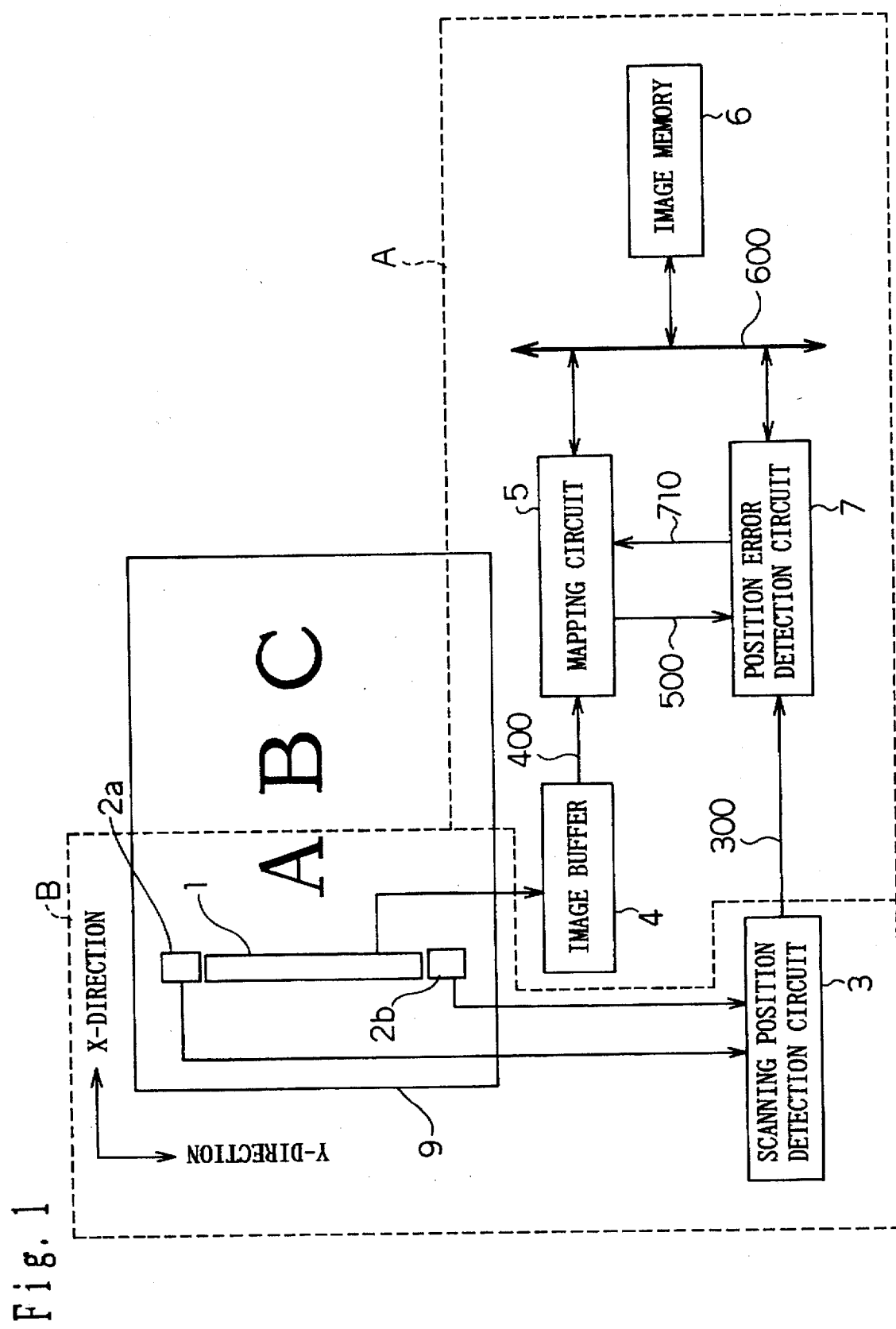
FIG. 1 is a block diagram showing an image processing apparatus A and an image reading part B which reads and scans an original image.

A first embodiment of an image processing apparatus of this invention will now be described with reference to the drawings. FIG. 1 is a block diagram showing an image processing apparatus A and an image reading part B which reads and scans an original image of the first embodiment of the invention. A line image sensor 1 reads an original image by being manually scanned on an original 1 and generates image data. The read image data is output to an image buffer 4.

Although not shown, a main body of a hand-held scanner to which the line image sensor 1 is mounted has two wheels in positions at both ends of the line image sensor 1, and encoders 2a and 2b are mounted on respective wheels for detecting rotation of the wheels (This is a known configuration of a hand-held scanner as described in, for example, Japanese unexamined patent publication No. S62-15964). The encoders 2a and 2b generate pulses having two phases which are different from each other according to the rotating directions of the wheels. A scanning position detection circuit 3 detects the travel distance of each wheel from the two-phase pulses taking the rotating direction of each wheel into account. Next, the scanning position detection circuit 3 calculates the coordinate of each wheel on the original based on the travel distance of each wheel. Further, the scanning position detection circuit 3 converts the coordinates of the wheels into the coordinates of the respective pixels read at both ends of the line image sensor 1 and outputs a scanning position coordinate 300. The operation of the scanning position detection circuit 3 will be detailed later.

A position error detection circuit 7 calculates a correlation value between high density image data 500 from a mapping circuit 5 and image data which has been already stored in an image memory 6. Furthermore, the position error detection circuit 7 corrects the scanning position coordinate 300 using a position correction amount calculated based on the correlation value and outputs a corrected position coordinate 710 to the mapping circuit 5. The mapping circuit 5 performs pixel density conversion on image data 400 and outputs the high density image signal 500. Further, the mapping circuit 5 generates an address in the image memory 6 using the corrected position coordinate 710. The mapping circuit 5 stores each pixel data of the high density image data 500 via a bus 600 into the image memory 6. The details of the operation of the position error detection circuit 7 and mapping circuit 5 will be described later.

Figure 2:
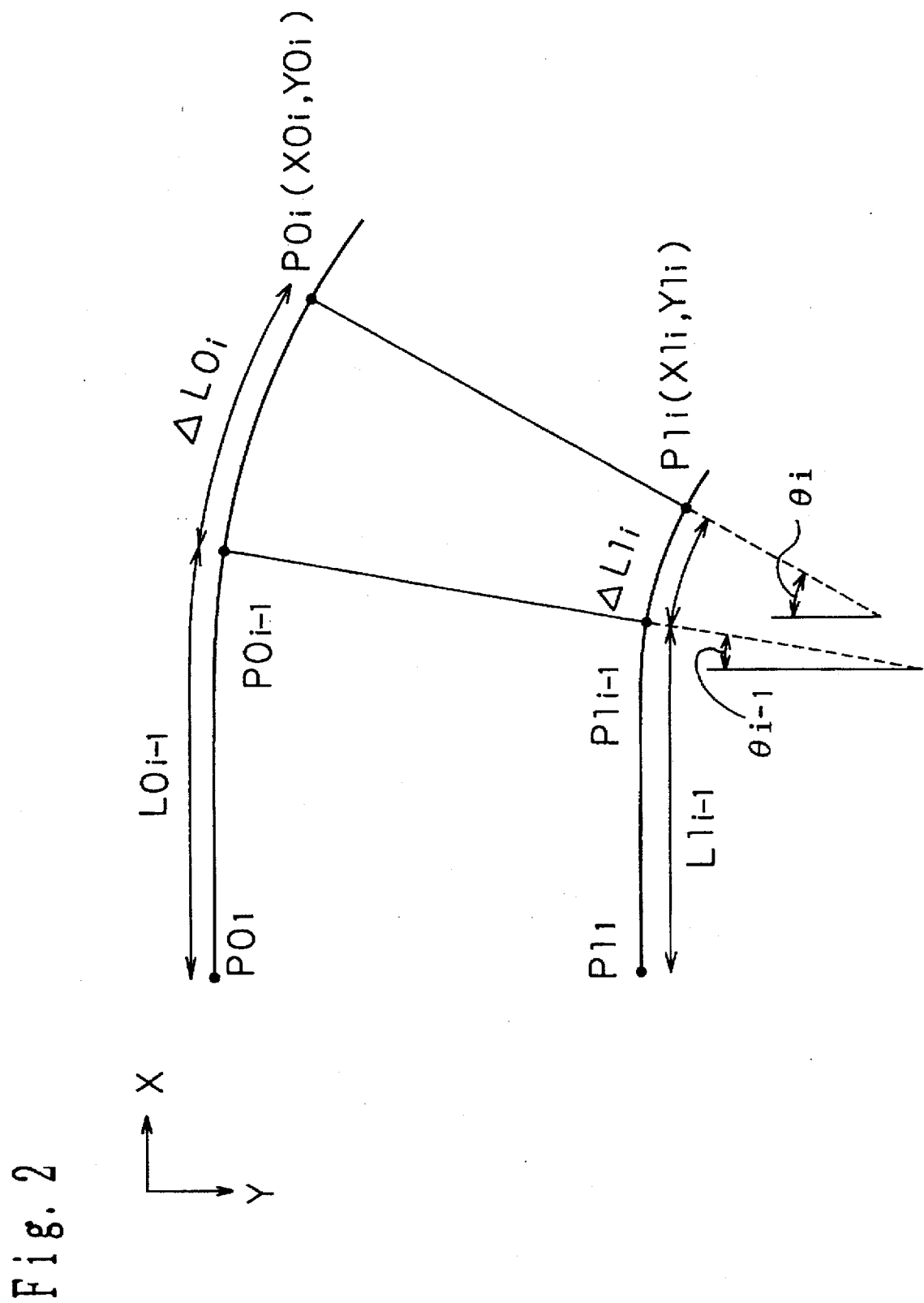
FIG. 2 is a schematic view showing an operation of a position detection circuit 3.

The operation of the scanning position detection circuit 3 will now be described more specifically. FIG. 2 is a schematic view showing an operation of the position detection circuit 3. In FIG. 2, thick lines show tracks of travel of the two wheels. Coordinates showing the positions of the two wheels at the time when the line image sensor 1 reads the image data in the i-th line are respectively described as $P0_i(X0_i, Y0_i)$ and $P1_i(X1_i, Y1_i)$. Here, provided that the coordinates of $P0_{i-1}$ and $P1_{i-1}$ are known, the coordinates of the $P0_i$ and $P1_i$ can be calculated approximately using the following Formula 1.

$$\theta_i - 1 = (L0_{i-1} - L1_{i-1})/D$$
$$X0_i = X0_{i-1} + \Delta L0_i \cdot \cos\theta_{i-1}$$
$$Y0_i = Y0_{i-1} + \Delta L0_i \cdot \sin\theta_{i-1}$$
$$X1_i = X0_i - D \cdot \sin\theta_{i-1}$$
$$Y1_i = Y0_i - D \cdot \cos\theta_{i-1}$$
(Formula 1)

where $L0_{i-1}$ represents the distance traveled by the wheels while reading from the start to the (i–1)-th line; and $\Delta L0_i$ represents the distance traveled by the wheels while reading from the (i–1)-th line to the i-th line. A traveling distance can be a negative value because the rotating directions of the wheels are taken into consideration. D represents the distance between the two wheels. Formula 1 is an approximate calculation based on an assumption that $\Delta\theta = |\theta_i - \theta_{i-1}| = |\Delta L0_i - \Delta L1_i|/D$ is 0. $\Delta\theta$ represents an angle change of the line image sensor 1 that occurs during scanning of one line by the line image sensor 1. With the coordinates of the two wheels at the start of reading determined, the coordinates of the two wheels can be calculated from the travels distances thereof using Formula 1.

Figure 3:
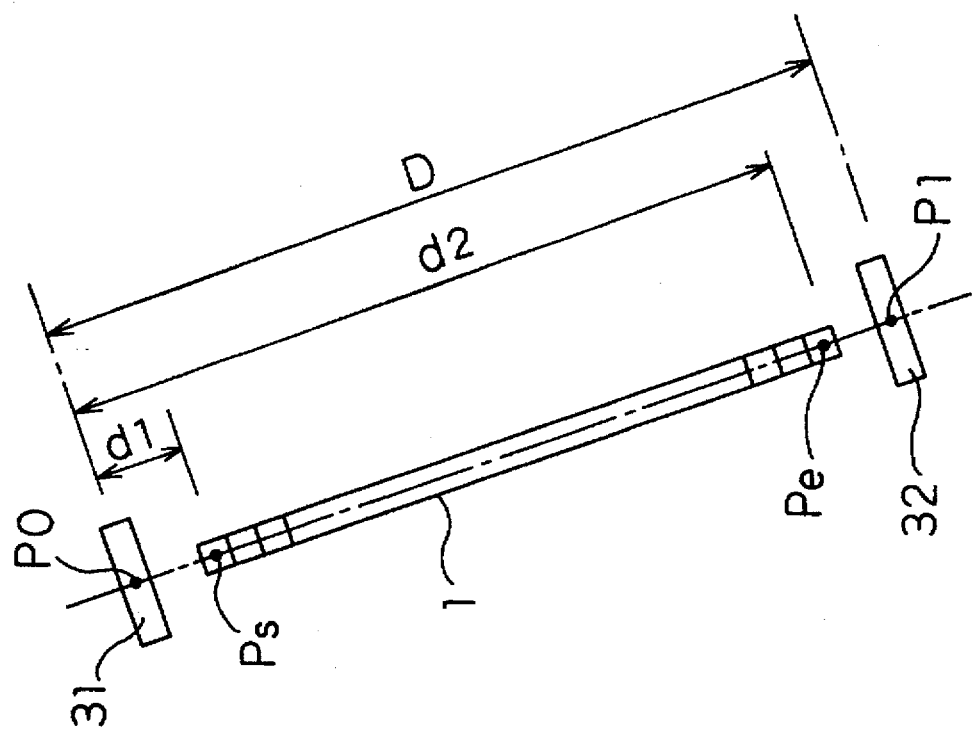
FIG. 3 is a schematic view showing calculation of the coordinates of pixels read at both ends of a line image sensor 1.

FIG. 3 is a schematic view showing calculation of the coordinates of the pixels read at both ends of the line image sensor 1. Here, coordinates of wheel 31 and 32 are represented by P0(X0, Y0) and P1(X1, Y1), respectively. Coordinates Ps(Xs, Ys) and Pe(Xe, Ye) of the pixels at both ends of the line image sensor 1 can be calculated using the following Formula 2.

$$Xs = X0 + (X1 - X0) \cdot d1/D$$
$$Ys = Y0 + (Y1 - Y0) \cdot d1/D$$
$$Xe = X0 + (X1 - X0) \cdot d2/D$$
$$Ye = Y0 + (Y1 - Y0) \cdot d2/D$$
(Formula 2)

where D represents the distance between the wheels 31 and 32; d1 represents the distance from the wheel 31 to the read pixel Ps; and d2 represents the distance from the wheel 31 to the read pixel Pe.

The scanning position detection circuit 3 obtained the travel distance of the wheels from the two-phase pulses from the encoders 2a and 2b, carries out the calculations of the Formulas 1 and 2, and outputs the coordinates of the pixels read at both ends of the line image sensor 1 as the scanning position coordinate 300.

Figure 4:
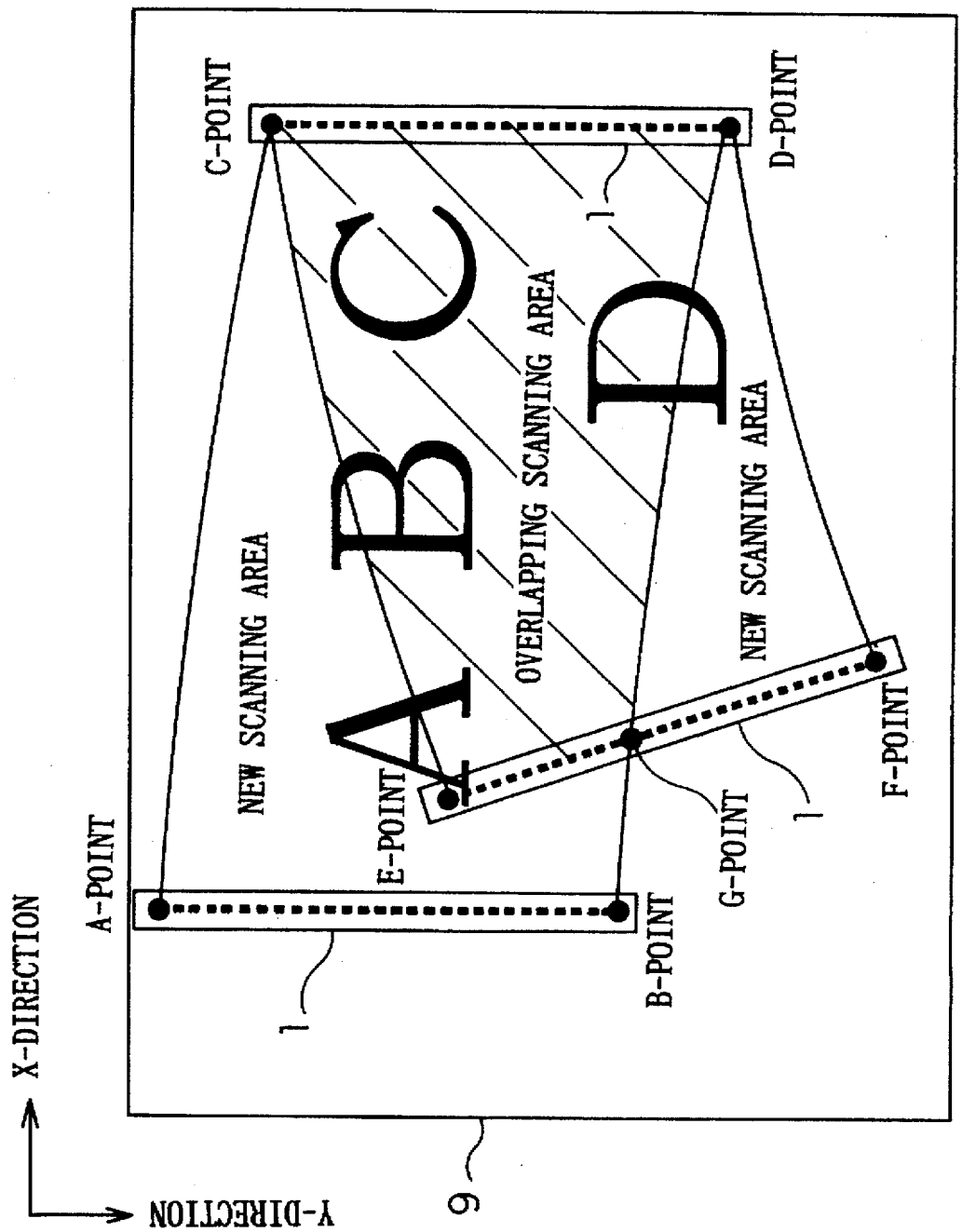
FIG. 4 is a schematic view showing scanning areas of the line image sensor 1.

FIG. 4 is a schematic view showing scanning areas of the line image sensor 1. A description will be made with reference to FIG. 4 on a movement of the line image sensor during manual scanning of the same in a case wherein a reading area on an original 9 is wider than the length of the line image sensor 1. In order to read the original, the operator manually puts a main body of a hand-held scanner in contact with the original and manually scans the original 9 by reciprocating it thereon. At this time, the two wheels disposed at the main body rotate, and two-phase pulses are output from the encoders 2a and 2b. FIG. 4 shows areas on the original read by the line image sensor 1.

Since the line image sensor 1 can not scan the entire width of the original 9, the image reading part B (FIG. 1) reads the entire original by the reciprocating motion of the line image sensor 1. Although only positions of the pixels at both ends of the image sensor are indicated in FIG. 4, the image sensor 1 reads an image present on a line that connects the pixels at both ends of the image sensor 1. For example, if the pixels at both ends of the line image sensor are indicated as an A-point and a B-point, the line image sensor 1 reads on a line that connects the A-point and B-point. (hereinafter, this is referred to as a "reading position A-B).

In FIG. 4, the line image sensor 1 starts scanning at the reading position A-B and scans to a reading position C-D. Image data read from a reading area ABCD surrounded by A-point, B-point, C-point, and D-point is stored newly in the image memory 6. Hereinafter, such an area is referred to as a "new scanning area".

Next, the line image sensor 1 scans in the backward direction from a reading position C-D as the scan start position to a reading position E-F. An area CDGE surrounded by C-point, D-point, G-point, and E-point is an area in which the images overlap. Hereinafter, this area which is read redundantly is referred to as an "overlapping scanning area". An area DGF surrounded by the D-point, G-point, and F-point is a new scanning area. Each pixel in image data read from the area ABCD is stored in the image memory 6 by the mapping circuit 5 based on a scanning position coordinate from the position detection circuit 3. Next, the line image sensor 1 moves in the backward direction to scan from the reading position C-D to the reading position E-F. At this time, there are three scanning areas, i.e., the overlapping scanning area CDGE, a new scanning area ABGEC, and the new scanning area DFG.

If the scanning position coordinate 300 has no position error, each pixel in the read image data can be mapped to and stored in the image memory 6 based on the scanning position coordinate 300. In other words, even if the image data read from the overlapping scanning area is overwritten in the image memory, the read image in the image memory has no discrepancy at a part where the new scanning area ABGEC and the overlapping scanning area CDGE are joined together. However, the scanning position coordinate 300 includes an error due to influence of accuracy of structural design of the hand-held scanner, slip between the wheels and the original, sinking of the wheels into the original, and the width between the wheels during manual scanning in curves. Further, since the scanning position detection circuit 3 obtains the travel distances of the encoders by counting the two-phase pulses output from the encoders 2a and 2b, the above-mentioned error is accumulated. Therefore, when the image data 400 is mapped to the image memory 6 using the scanning position coordinate 300, a discrepancy arises in the image at the above-mentioned joint part.

In order to prevent this discrepancy of an image, the position error detection circuit 7 uses the image data of the overlapping scanning area CDGE stored in the image memory 6 and the high density image data 500 to calculate a correlation value which indicates the degree of the correlation between these data. Furthermore, the position error detection circuit 7 calculates a position correction amount for correcting the scanning position coordinate based on this correlation value. Further, the position error detection circuit 7 corrects the scanning position coordinate 300 in accordance with this position correction amount and outputs a corrected position coordinate 710 to the mapping circuit 5. In accordance with the corrected position coordinate 710, the mapping circuit 5 generates an address to allow each pixel in the high density image data 500 to be mapped to and stored in the image memory 6. As for extraction of the overlapping scanning area, the description follows later.

Figure 7:
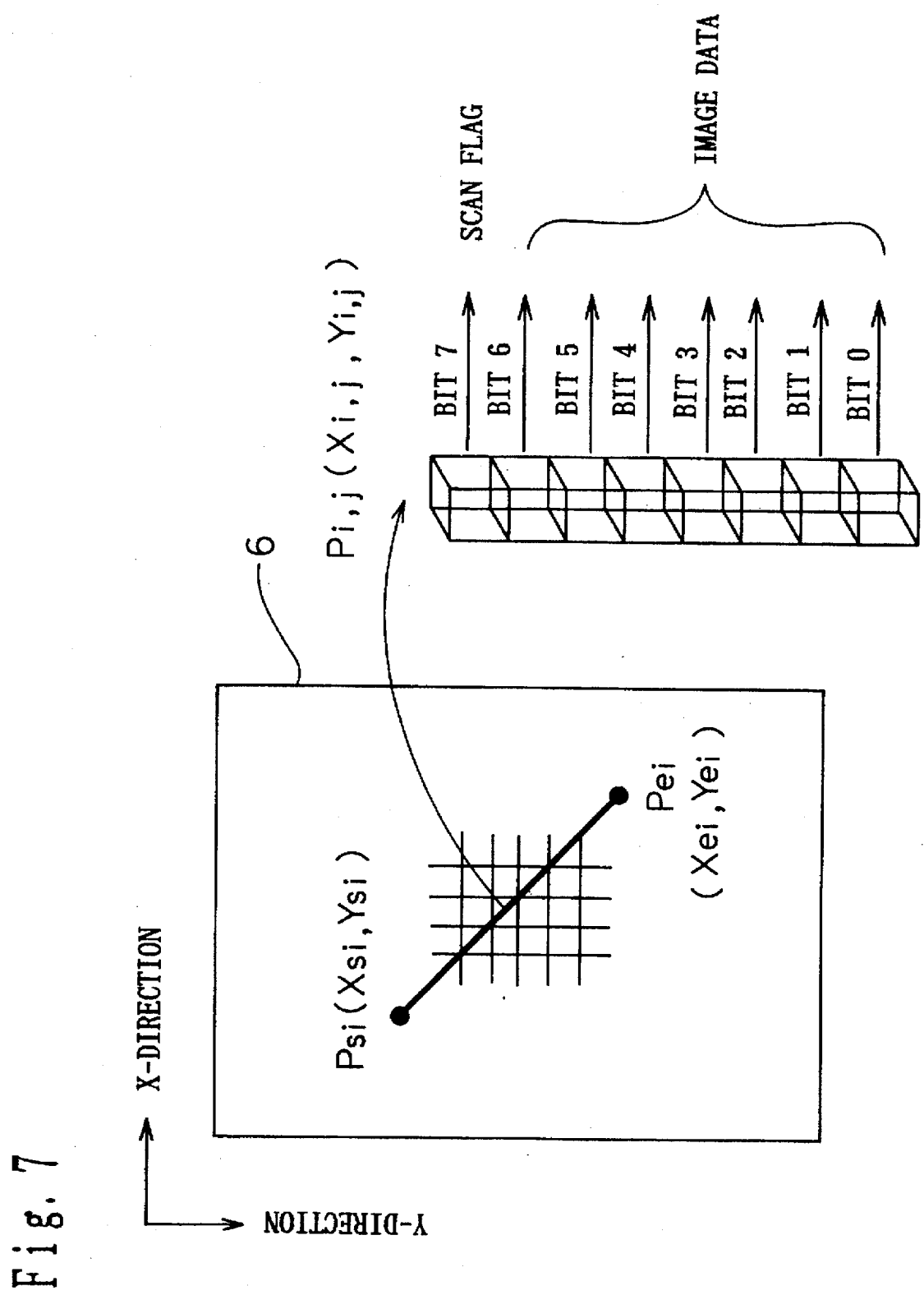
FIG. 7 is a schematic view showing an image memory 6.

FIG. 7 is a schematic view showing the image memory 6. Each pixel in the image memory 6 has a bit configuration constituted by a write flag storage bit (bit 7) and image data storage bits (bits 0 through 6). The number of the image data storage bits is not specified and can be designed according to the number of necessary gradations. The present embodiment deals with an image of 128 gradations and, in order to store gradation data having 0 to 127 values, 7 bits are allocated for each pixel in the image memory. A write flag in a bit 7 is "0" when the image data is not written in the image memory 6 (unstored condition) and is "1" when the image data is already written (stored condition).

Figure 5:
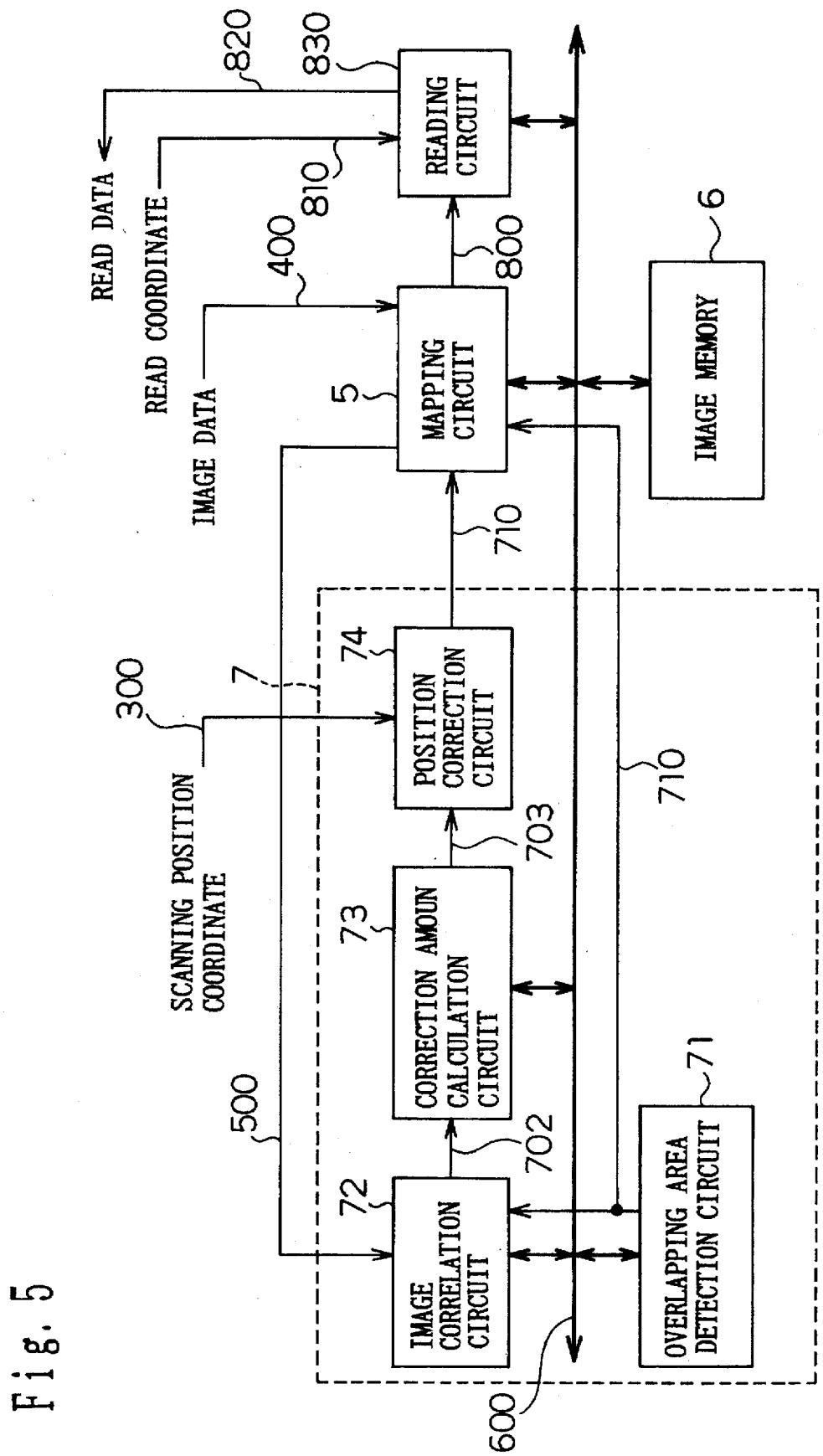
FIG. 5 is a block diagram of a position error detection circuit 7.

The operation of the position error detection circuit 7 will now be described. FIG. 5 is a block diagram of the position error detection circuit 7. Before the line image sensor 1 starts scanning for reading, all the data in the image memory 6, a position correction amount 703 in the correction amount calculation circuit 73, and a correlation table in an image correlation circuit 72 are initialized to "0". After the initialization, each time the line image sensor 1 scans a line to read it, the scanning position coordinate 300 is corrected by a position correction circuit 74 and is output to the mapping circuit 5 as the corrected position coordinate 710. At the time when the line image sensor 1 starts reading, since the position correction amount is "0", the scanning position coordinate 300 and the corrected position coordinate 710 have the same coordinate value.

The mapping circuit 5 performs an image density conversion process to increase the density of image data 400 and generates a high density image signal 500. Further, the mapping circuit 5 uses an input corrected position coordinate 710 to calculate an address ADRn of the image memory 6 in which each pixel data Pn of the high density image signal is to be stored. The operation of the mapping circuit 5 will be detailed later. The mapping circuit 5 reads the pixel data Pn stored in the address ADRn of the image memory 6 by way of the bus 600 in accordance with the address ADRn and outputs the pixel data Pn to an overlapping area detection circuit 71 via the bus 600. The mapping circuit 5 also outputs an origin coordinate 800. The origin coordinate 800 is the coordinate value of the origin of the image memory 6 and is used to read out image data in the image memory to an external microcomputer (not shown) for display and printing.

In response to input of a coordinate 810 of image data to be read from the outside, a reading circuit 830 reads the image data corresponding to the coordinate (read image data 820) from the image memory 6 and outputs the same. The reading circuit 830 is not shown in FIG. 1. For reading image data in the image memory from the outside, the reading circuit 830 is not required where the external microcomputer or the like directly outputs the address in the image memory.

The overlapping area detection circuit 71 checks the write flag (bit 7) of the pixel Pn to determine image data has already been stored in the address ADRn of this pixel data Pn. If the bit 7 of the pixel data Pn is "1", the address ADRn has image data stored therein as a result of the reading of the sensor. Then, it is determined that the pixel data Pn is included in an overlapping scanning area. If the bit 7 is "0", it is determined that the pixel data Pn. is included in a new scanning area. Further, the overlapping area detection circuit 7 outputs a signal 701 to the image correlation circuit 72 and the mapping circuit 5. The signal 701 is a signal which indicates "0" when the pixel data Pn is included in a new scanning area and indicates "1" when the pixel data Pn in included in an overlapping scanning area.

The image correlation circuit 72 performs a correlation value calculation process on the pixel data Pn when the signal 701 is "1" and does not perform it when the signal 701 is "0". The mapping circuit 5 stores the high density pixel data Pn in the image memory 6 when the signal 701 is "0". The mapping circuit 5 does not store the data Pn in the image memory 6 when the signal 701 is "0". This series of operations for one pixel is repeated for all of the pixel data contained in one line of the high density image data 500.

When the above-described process is finished for the high density image data 500 of one line, the image correlation circuit 72 uses a correlation table created by a correlation value calculation process carried out only on pixels included in an overlapping scanning area to detect the direction of a position error of the scanning position coordinate 300. Furthermore, the image correlation circuit 72 outputs an offset value 702 to cancel the position error to the correction amount calculation circuit 73. If all the high density pixels in one line are included in a new scanning area, the correlation table in the image correlation circuit 72 remains at the initial value "0". In this case, the above-mentioned offset value 702 is "0" (no position error).

The correction amount calculation circuit 73 adds the offset value 702 to a cumulative value of the correction amount maintained therein and outputs a position correction amount 703. The position correction circuit 74 adds the position correction amount 703 to the scanning position coordinate 300 of the image data of one line to be processed next and outputs the result to the mapping circuit 5 as a corrected position coordinate 710. Thereafter, the above-described series of processes is repeated on each of subsequent lines.

Figure 6:
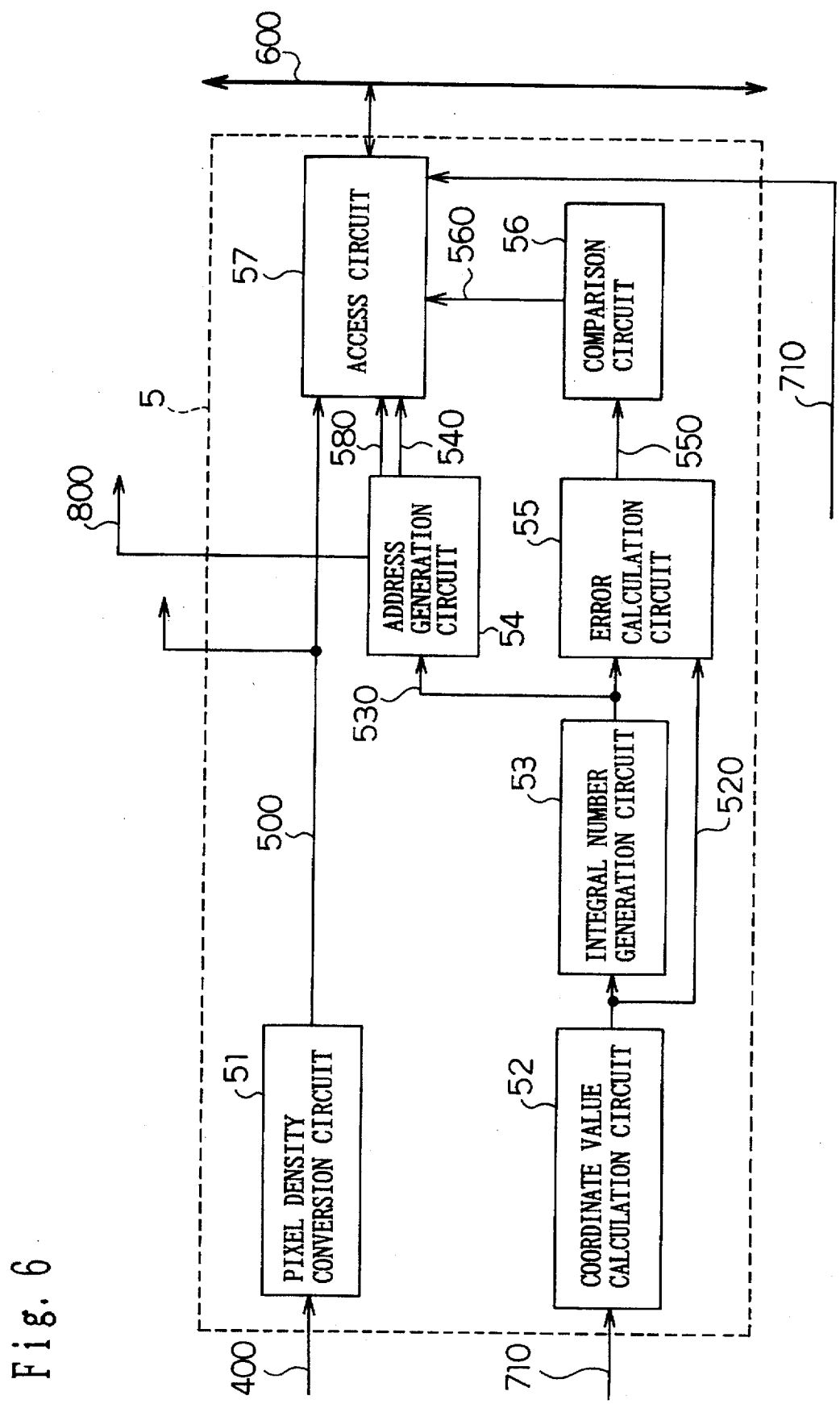
FIG. 6 is a block diagram of a mapping circuit 5.

FIG. 6 is a block diagram of the mapping circuit 5. The operation of the mapping circuit 5 will be described with reference to FIG. 6 and FIG. 7. A pixel density conversion circuit 51 generates three interpolation pixels for each pixel data included in image data 400 and outputs high density image data 500 of a density which has been doubled.

Figure 10:
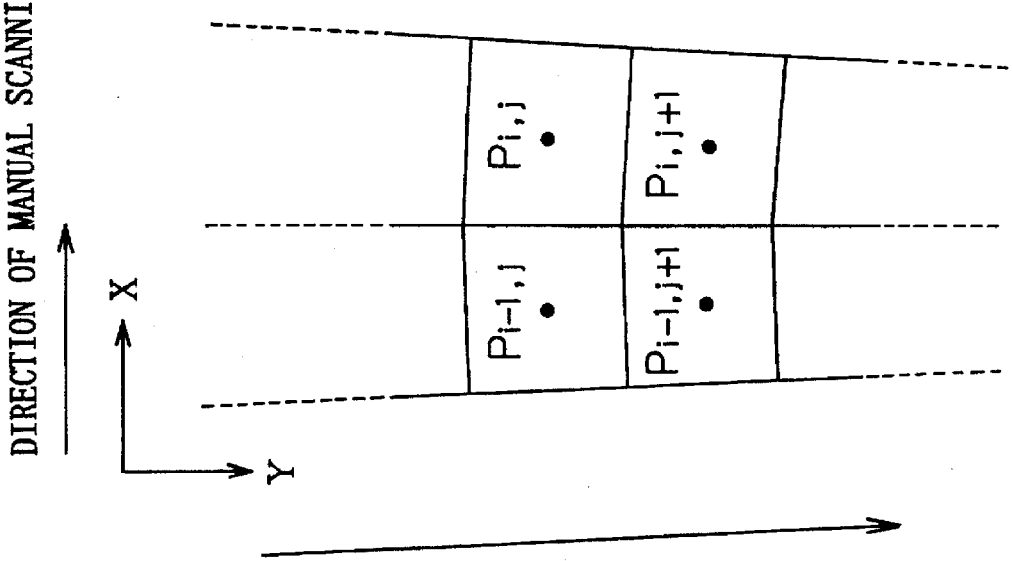
FIG. 10 including

A method of generating the interpolation pixels will be described with reference to FIG. 10. FIG. 10 is a schematic view showing pixel density conversion. $P_{i,j}$ represents the j-th pixel data in the image data of the i-th line included in the image data 400. A black dot represents the coordinate of each pixel data. FIG. 10(a) shows four adjoining pixels in the image data 400. A description will be made on generation of three interpolation pixels for the pixel data $P_{i,j}$ in the image data 400. In FIG. 10(b), $Q_{i,j}$, $R_{i,j}$, and $S_{i,j}$ represent interpolation pixels. Each interpolation pixel data is calculated using the following Formula 3.

$$Q_{i,j} = (P_{i,j} + P_{i,j+1})/2 \qquad \text{(Formula 3)}$$
$$R_{i,j} = (P_{i,j} + P_{i+1,j})/2$$
$$S_{i,j} = (P_{i,j} + P_{i,j+1} + P_{i+1,j} + P_{i+1,j+1})/4$$

Next, a coordinate value calculation circuit 52 will be described. The corrected position coordinate 710 which is a coordinate value after the correction of the pixels at both ends of the line image sensor 1 is input to the coordinate value calculation circuit 52. The coordinate value calculation circuit 52 uses the corrected position coordinate 710 to calculate a coordinate value 520 of each pixel in the high density image data 500. A description will be made on the operation of the coordinate value calculation circuit 52 in a case as shown in FIG. 7 wherein the coordinates (corrected position coordinates 710) of both end pixels $P_{si}$ and $P_{ei}$ of the line image sensor 1 are (Xshd i, $Y_{si}$) and ($X_{ei}$, $Y_{ei}$), respectively. A suffix i indicates a corrected position coordinate for the i-th line of the image data 400. Here, the reading pixel density of the line image sensor 1 is 8 pixels/mm; the image density of an image stored in the image memory is 8 pixels/mm; and $X_{si}$, $Y_{si}$, $X_{ei}$, and $Y_{ei}$ are real values in a unit of ⅛ mm.

A coordinate ($XP_{i,j}$, $YP_{i,j}$) of the pixel data $P_{i,j}$ is calculated using the following Formula 4 where Nd represents the number of pixels read in one line by the line image sensor 1 and j represents a pixel number in one line.

$$XP_{i,j} = Xs_i + \{(Xe_i - Xs_i)/(ND - 1)\} \cdot j \qquad \text{(Formula 4)}$$
$$YP_{i,j} = Ys_i + \{(Ye_i - Ys_i)/(ND - 1)\} \cdot j$$

Coordinates ($XQ_{i,j}$, $YQ_{i,j}$), ($XR_{i,j}$, $YR_{i,j}$), and ($XS_{i,j}$, $YS_{i,j}$) of three interpolation pixel data $Q_{i,j}$, $R_{i,j}$, and $S_{i,j}$ corresponding to the pixel data Pi,j are calculated using the following Formula 5.

$$XQ_{i,j} = (XP_{i,j} + XP_{i,j+1})/2 \qquad \text{(Formula 5)}$$
$$YQ_{i,j} = (YP_{i,j} + YP_{i,j+1})/2$$
$$XR_{i,j} = (XP_{i,j} + XP_{i-1,j})/2$$
$$YR_{i,j} = (YP_{i,j} + YP_{i-1,j})/2$$
$$XS_{i,j} = (XP_{i,j} + XP_{i,j+1} + XP_{i-1,j} + XP_{i-1,j+1})/4$$
$$YS_{i,j} = (YP_{i,j} + YP_{i,j+1} + YP_{i-1,j} + YP_{i-1,j+1})/4$$

The coordinate value calculation circuit 52 calculates the coordinate value 520 of each pixel in the high density signal 500 by conducting the operation processes shown as Formulas 4 and 5.

An integral number generation circuit 53 converts the coordinate value 520 which is a real number into an integral number and outputs an integral number coordinate value 530. Let us assume that the real number coordinate value 520 is represented by ($X_{real}$, $Y_{real}$) and the integral number coordinate value 530 is represented by ($X_{int}$, $Y_{int}$). Then, the integral number coordinate value is calculated using the following Formula 6 wherein [] indicates an operation of rounding off below decimals.

$$X_{int} = [X_{real}] \qquad \text{(Formula 6)}$$
$$Y_{int} = [Y_{real}]$$

An address generation circuit 54 converts the integral number coordinate value 530 into an address 540 in the image memory 6 and outputs a judgement signal 580 indicating whether the generated address 540 is valid or invalid. The address generation circuit 54 also outputs the origin coordinate 800 of the image memory. The judgement signal 580 and origin coordinate 800 will be described in detail later.

Figure 11:
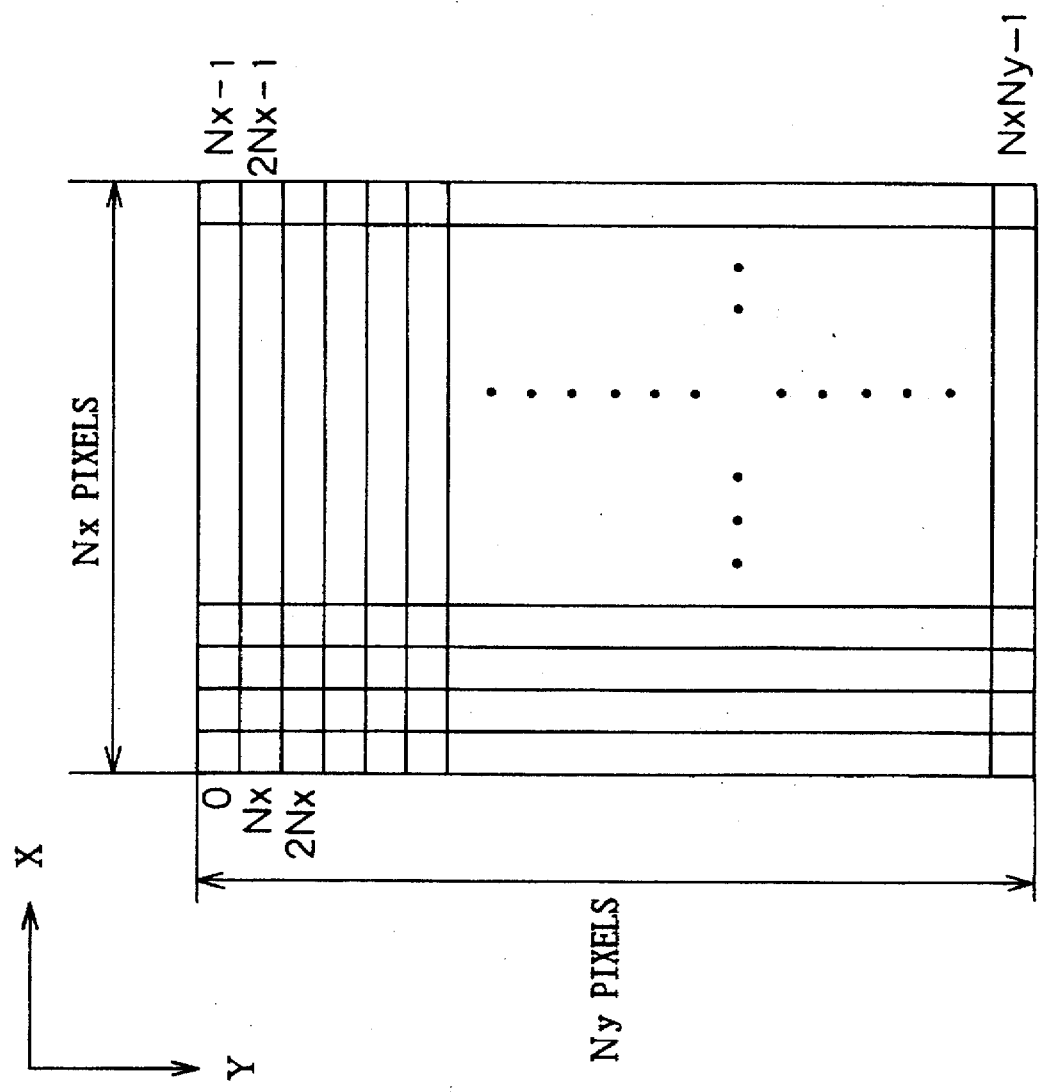
FIG. 11 is a schematic view showing an arrangement of addresses in the image memory 6.

FIG. 11 shows an arrangement of addresses in the image memory 6. The image memory 6 is a page memory having Nx pixels in the X-direction and Ny pixels in the Y-direction. The address of the pixel on the upper left corner of the image memory is 0. The address at the upper right corner is Nx−1. The address at the lower right corner is Nx·Ny−1.

Figure 14:
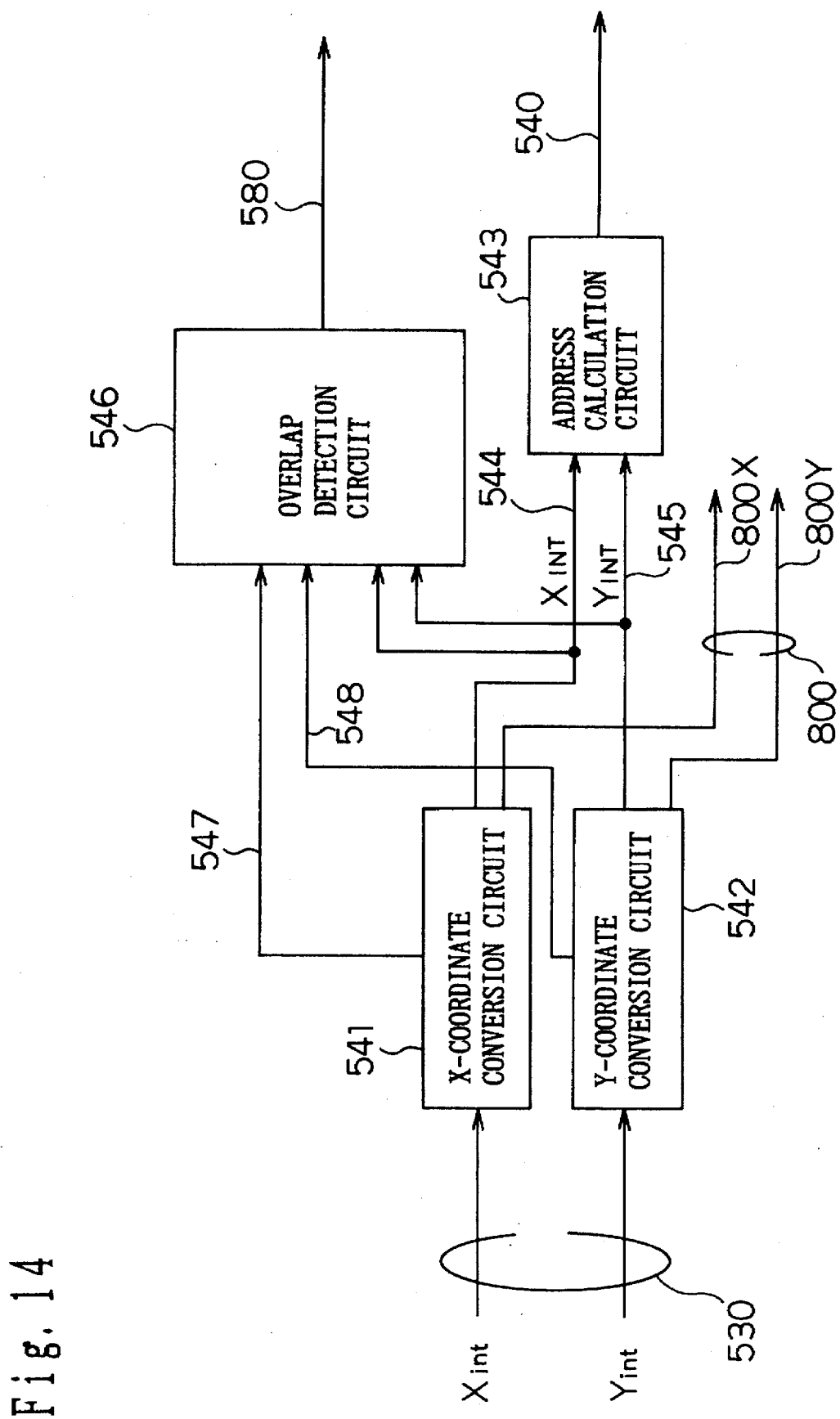
FIG. 14 is a block diagram of an address generation circuit 54.

FIG. 14 is a block diagram of the address generation circuit 54 shown in FIG. 6 wherein the integral number coordinate value 530 is shown as ($X_{int}$, $Y_{int}$). When the value of $X_{int}$ is out of the range from 0 to Nx−1, an X-coordinate conversion circuit 541 activates a signal 547 and outputs a value Xp by shifting the value of $X_{int}$ by Nx. The value of Xp is within the range from 0 to Nx−1. Further, when the value of $X_{int}$ is within the range from 0 to Nx−1, the X-coordinate conversion circuit 541 inactivates the signal 547 and outputs the value of $X_{int}$ as it is as $X_{int}'$. Then, the value of an output XINT 544 ($X_{int}'$ or Xp) of the X-coordinate conversion circuit 541 is within the range from 0 to Nx−1. The X-coordinate conversion circuit 541 also outputs an X-coordinate 800X of the origin of the image memory 6. The X-coordinate 800X of the origin is decided when the image reading is over.

Similarly, when the value of the $Y_{int}$ is out of the range from 0 to Ny−1, a Y-coordinate conversion circuit 542 activates a signal 548 and outputs a value Yp by shifting the value of $Y_{int}$ by Ny. The value of Yp is within the range from 0 to Ny−1. When the value of $Y_{int}$ is within the range from 0 to Ny−1, the Y-coordinate conversion circuit 542 inactivates the signal 548 and outputs the value of $Y_{int}$ as it is as $Y_{int}'$. Then, the value of an output YINT 545 (Yint' or Yp) is within the range from 0 to Ny−1. The Y-coordinate conversion circuit 542 also outputs a Y-coordinate 800Y of the origin of the image memory 6. The Y-coordinate 800Y of the origin is decided when the image reading is over.

An address calculation circuit 543 performs the following calculation (Formula 7) to calculate and output the address 540 in the image memory. An address ADR in the image memory is calculated using the following Formula 7.

$$ADR = XINT + Nx \cdot YINT \quad \text{(Formula 7)}$$

Figure 13:
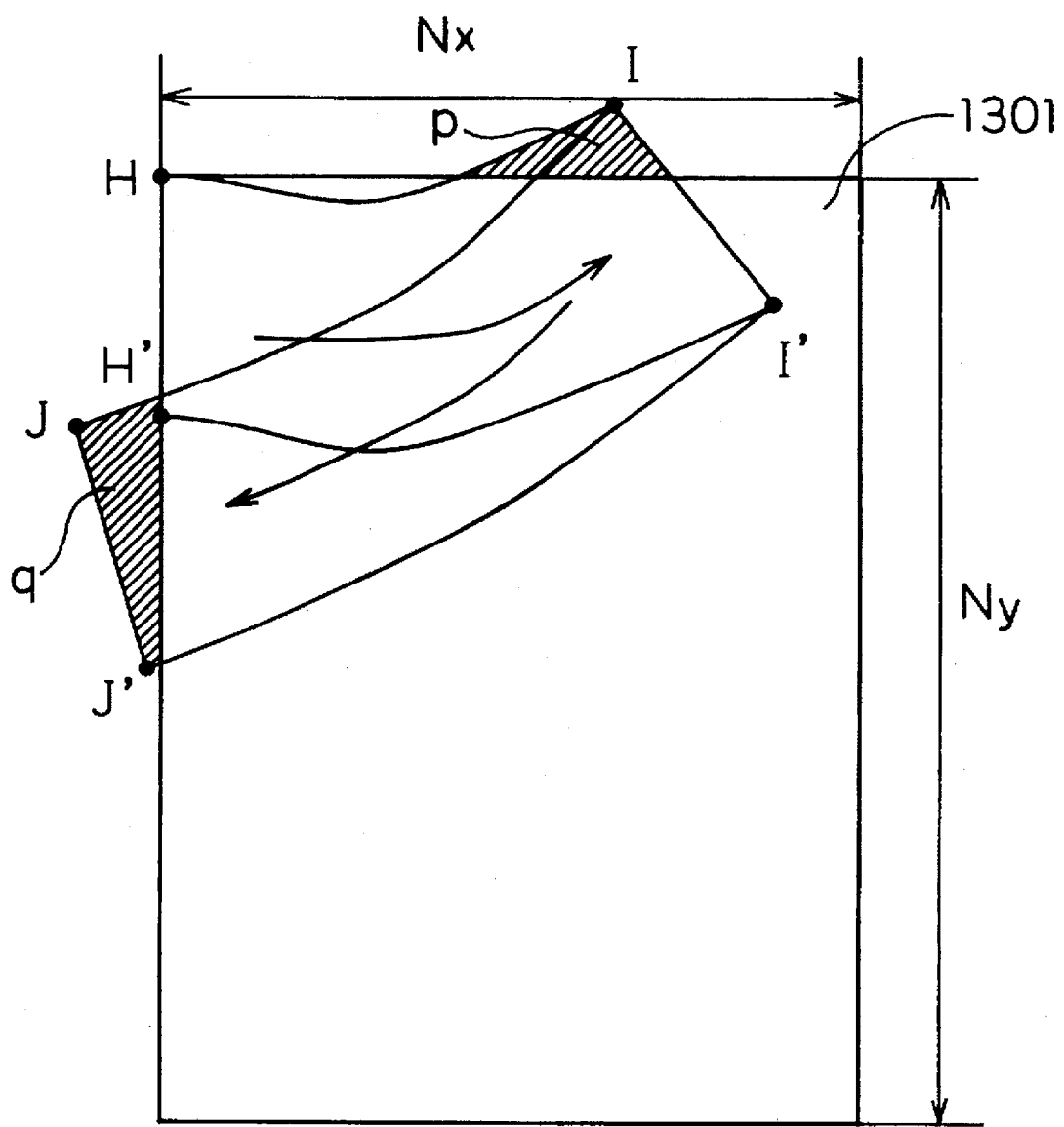
FIG. 13 is a schematic view showing a problem with a conventional image processing apparatus.
Figure 15:
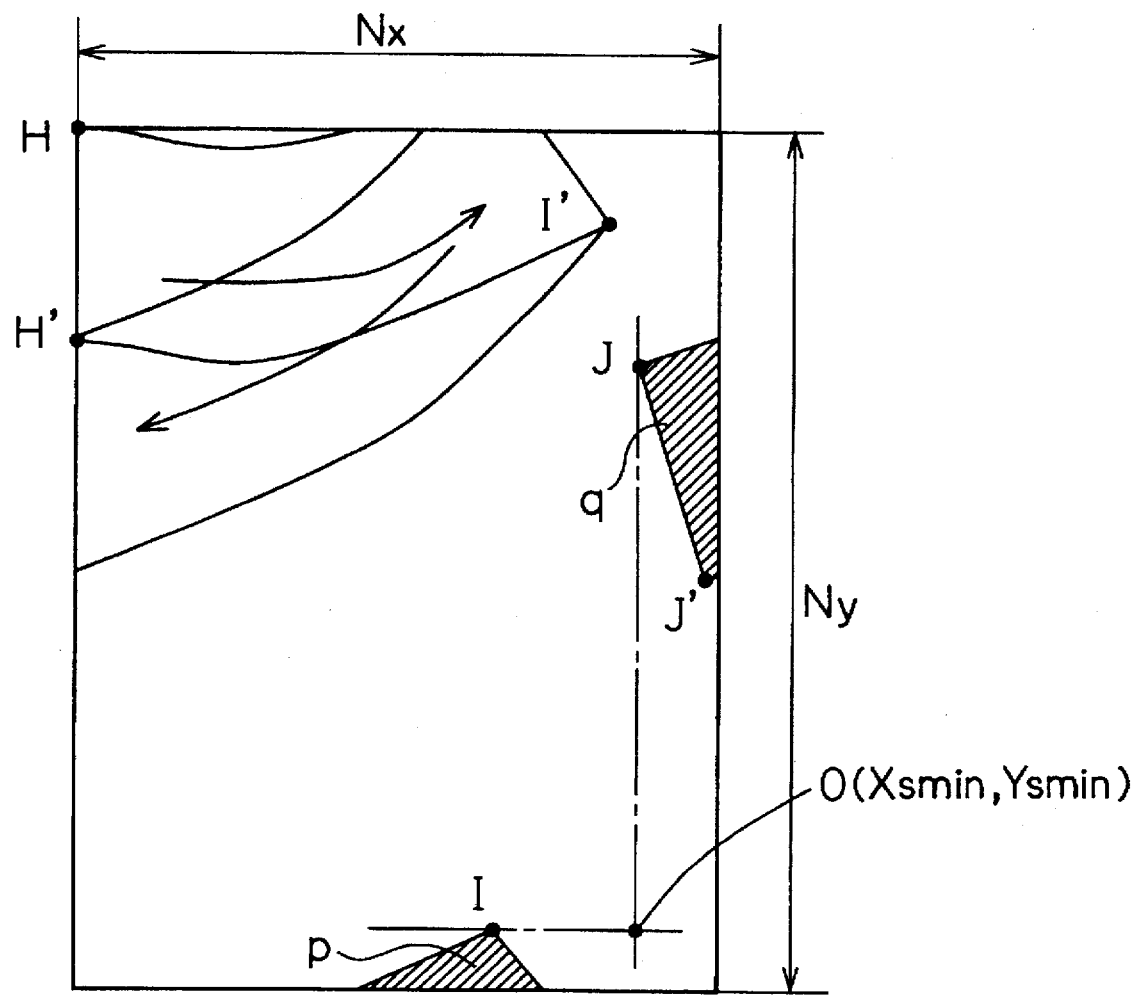
FIG. 15 is a schematic view showing a method of storing image data in a memory according to the present invention.

When the integral coordinate value ($X_{int}$, $Y_{int}$) is out of the range of the image memory, the X-coordinate conversion circuit 541 and Y-coordinate conversion circuit 542 shift the coordinate values so that they come in the range and output a coordinate value (XINT, YINT). This shifting process allows the scanning areas p and q in FIG. 13 to be shifted into the area of the image memory as shown in FIG. 15 and to be stored in the image memory 6. This allows efficient utilization of the capacity of the image memory. When image data stored in the image memory is read out from the image memory, the coordinate is read out in reverse based on an assumption that a coordinate O ($X_{smin}$, $Y_{smin}$) shown in FIG. 15 is the coordinate origin of the image memory. The coordinate O ($X_{smin}$, $Y_{smin}$) is determined by the coordinates 800X and 800Y shown in FIG. 14 when the image reading is over.

However, if the image data stored in the image memory area after being shifted (the image data in the areas p and q in FIG. 15) is overwritten on image data which has been stored without being shifted, continuity of the read image in the image memory can not be maintained. When the unshifted image data stored in the image memory area is overwritten on the image data stored after being shifted conversely, continuity of the read image in the image memory also can not be maintained.

In order to avoid the above-mentioned problem, an overlap detection circuit 546 outputs a judgement signal 580 which indicates that overwrite as described above will not occur. Specifically, when the judgement signal 580 is active (at "H" level), the address 540 is valid and image data can be stored in the address in the image memory indicated by the address 540. The overlap detection circuit 546 outputs the judgement signal 580 indicating whether the address 540 is valid or invalid based on the signal 547 and XINT 544 output by the X-coordinate conversion circuit 541 and the signal 548 and YINT 545 output by the Y-coordinate conversion circuit 542.

Figure 16:
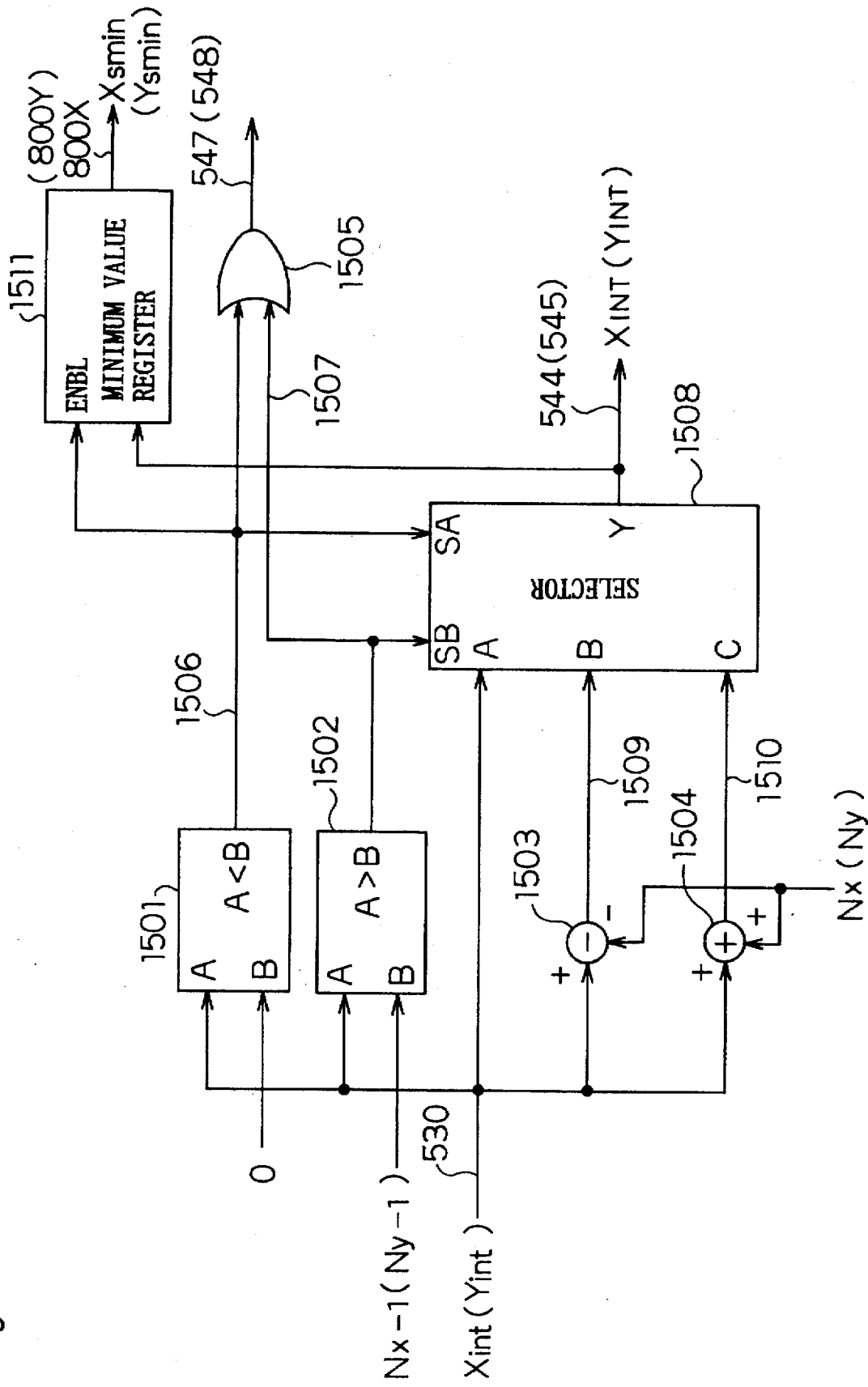
FIG. 16 is a block diagram of a first embodiment of an X-coordinate conversion circuit 541.

FIG. 16 is a block diagram of a first embodiment of the X-coordinate conversion circuit 541 (FIG. 14). The X-coordinate conversion circuit 541 and the Y-coordinate conversion circuit 542 have the same configuration. FIG. 16 serves as a block diagram of the Y-coordinate conversion circuit 542 if the signal names, numbers and values in the brackets are used.

A comparator 1501 compares the integral number coordinate value $X_{int}$ with 0 and puts a signal 1506 at "H" level. If the integral number coordinate value $X_{int}$ is represented by a two's complement, the comparator 1501 is not necessary, and the MSB of $X_{int}$ can be used as the signal 1506. A comparator 1502 compares the integral number coordinate value $X_{int}$ with Nx−1 (the maximum X-coordinate value in the image memory) and puts a signal 1507 at "H" level if $X_{int}$ is greater than Nx−1. An OR gate 1505 carries out logical OR between the signal 1506 and signal 1507 and outputs the signal 547. When the signal 547 is at "H" level, XINT 544 has been shifted.

A subtracter 1503 subtracts Nx (the number of pixels in the X-direction of the image memory) from the integral number coordinate value $X_{int}$ and outputs a negative shift coordinate value 1509. An adder 1504 adds Nx to the integral number coordinate value $X_{int}$ and outputs a positive shift coordinate value 1510. According to the states of the signals 1506 and 1507, a selector 1508 selects one of the integral number coordinate value $X_{int}$, negative shift coordinate value 1509, and positive shift coordinate value 1510 and outputs it as the XINT 544. The function of the selector 1508 is shown on the following Table 1.

TABLE 1

| SA | SB | Y |
|---|---|---|
| 1 | 0 | C |
| 0 | 1 | B |
| 0 | 0 | A |
| 1 | 1 | Impossible |

Therefore, even if the integral number coordinate value $X_{int}$ is a value out of the range from 0 to Nx−1, the value of the output 544 (XINT) of the selector 1508 is converted by shifting it into a value within the range from 0 to Nx−1.

When an input to ENBL is at "H" level, a minimum value register 1511 updates and holds the minimum value of input data. In other words, the minimum value register 1511 outputs the minimum value of XINT after the shift-conversion when the integral number coordinate value $X_{int}$ is a negative value. The value in the minimum register 1511 is initialized before reading of an image is started. When the reading of the image is finished, the minimum value register 1511 outputs the X-coordinate ($X_{smin}$) of the origin coordinate O shown in FIG. 15.

Figure 17:
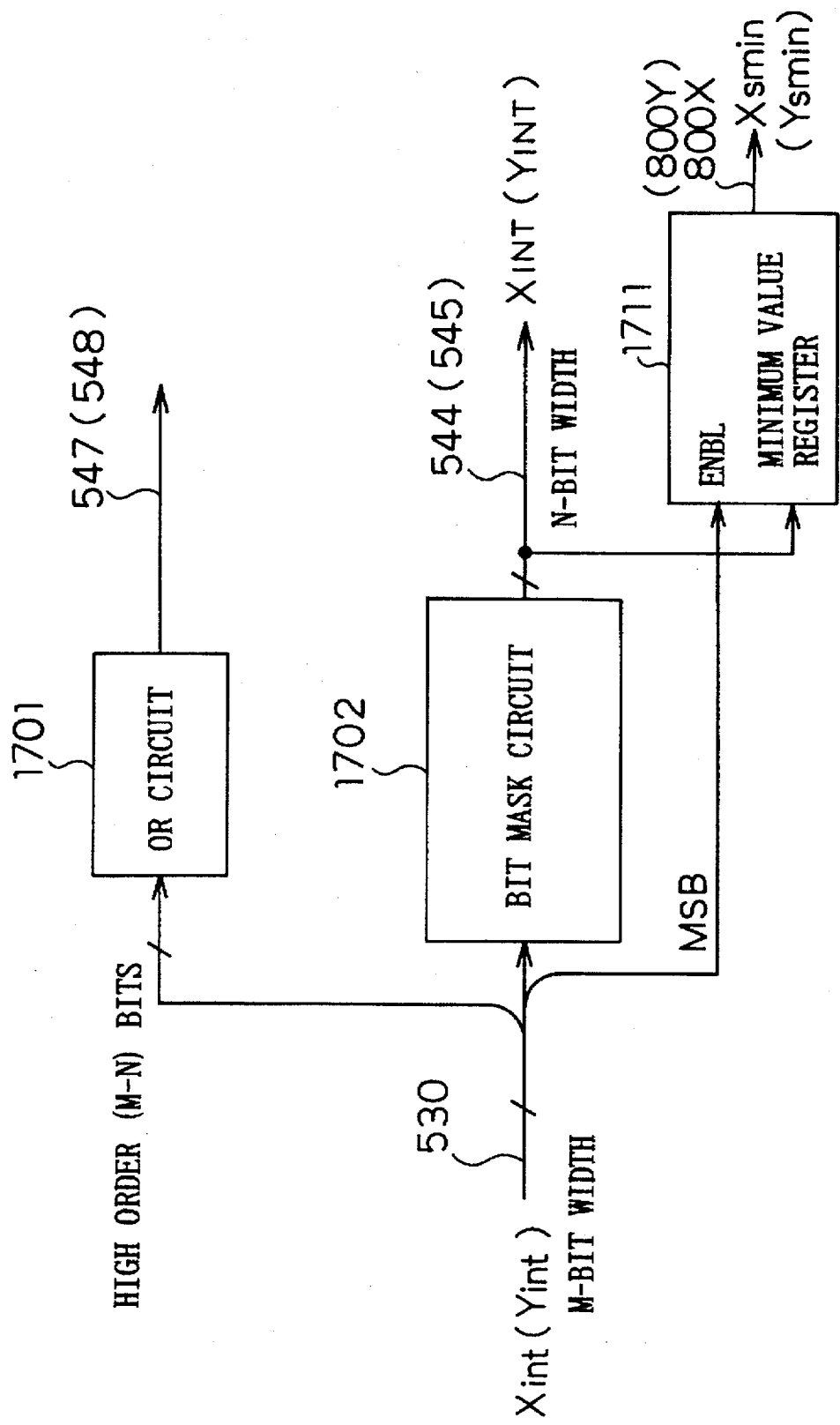
FIG. 17 is a block diagram of a second embodiment of the X-coordinate conversion circuit 541.

FIG. 17 is a block diagram of a second embodiment of the X-coordinate conversion circuit 541 (FIG. 14). FIG. 17 serves as a block diagram of the Y-coordinate conversion circuit 542 if the signal names, numbers, and values in the brackets in FIG. 17 are used. Let us assume that, in FIG. 17, the integral number coordinate value 530 ($X_{int}$) is represented by a two's complement having a bit width M and that the number of pixels in the X-direction (Nx) in the image memory is the N-th power of 2 (M>N). A bit mask circuit 1702 outputs N low order bits of the integral number coordinate value 530 ($X_{int}$). The output 544 (XINT) of the bit mask circuit is an N-bit negative value. Even if the integral number coordinate value $X_{int}$ is a value out of the range from 0 to Nx−1, this bit mask process allows the value XINT to be shifted and converted into a value within the range from 0 to Nx−1.

An OR circuit 1701 outputs the logical sum of the (M–N) high order bits of $X_{int}$ as the signal 547. If the signal 547 is at "H" level, $X_{int}$ has been a value out of the range from 0 to Nx–1, and the value of $X_{int}$ has been converted by the bit mask circuit 1702.

When an input to ENBL is at "H" level, a minimum value register 1711 updates and holds the minimum value of input data. In other words, the minimum value register 1711 outputs the minimum value of XINT after the shift-conversion when the integral number coordinate value $X_{int}$ is a negative value. The MSB of $X_{int}$ is input to ENBL of the minimum value register 1711. Since $X_{int}$ is an integral value represented by a two's complement, if the MSB is at "H" level, $X_{int}$ is a negative value. The value in the minimum value register 1711 is initialized before reading of an image is started. When the reading of the image is finished, the minimum value register 1711 outputs the X-coordinate ($X_{smin}$) of the origin coordinate O shown in FIG. 15.

Figure 18:
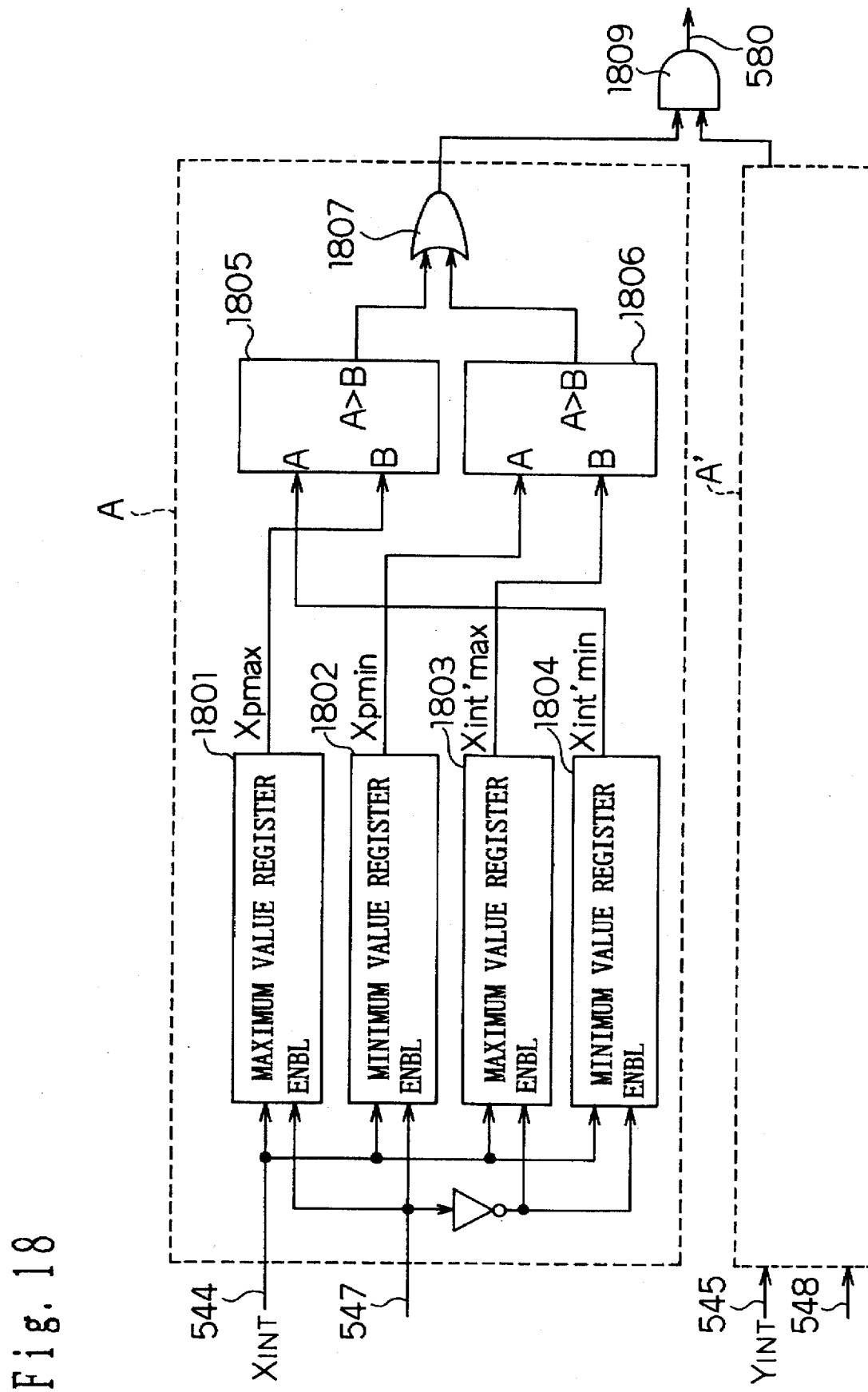
FIG. 18 is a block diagram of an overlap detection circuit 546.

FIG. 18 is a block diagram of the overlap detection circuit 546 (FIG. 14). In FIG. 18, the circuit blocks A and A' are identical in configuration. When an input to ENBL is at "H" level, maximum value registers 1801 and 1803 update and hold the maximum value of the input data. Similarly, when an input to ENBL is at "H" level, minimum value registers 1802 and 1804 update and hold the minimum value of the input data. The values in the maximum value registers and minimum value registers are initialized before reading of an image is started.

The maximum value register 1801 outputs the maximum value of XINT when the signal 547 is at "H" level, i.e., when the integral number coordinate value $X_{int}$ has been shifted and converted by the X-coordinate conversion circuit 541 (FIG. 14)($X_{pmax}$). The minimum value register 1802 outputs the minimum value of XINT when the signal 547 is at "H" level ($X_{pmin}$). The maximum value register 1803 outputs the maximum value of XINT when the signal 547 is at "L" level, i.e., when the integral number coordinate value $X_{int}$ serves as XINT as it is ($X_{int'max}$). The minimum value register 1804 outputs the minimum value of XINT when the signal 547 is at "L" level ($X_{int'min}$).

A comparator 1805 outputs a signal which becomes "H" level when $X_{int'min} > X_{pmax}$. A comparator 1806 outputs a signal which becomes "H" level when $X_{pmin} > X_{int'max}$. An OR gate 1807 outputs the logical sum of the comparators 1805 and 1806. The output of the OR gate 1807 is a signal which becomes "H" level when a condition "$X_{int'min} > X_{pmax}$" or "$X_{pmin} > X_{int'max}$" is satisfied. An AND gate 1809 outputs the logical product of the outputs of the circuit blocks A and A' as the judgement signal 580. Formula 8 shows a condition that allows the judgement signal 580 to become "H" level (active).

$$((X_{int'min} > X_{pmax}) \cup (X_{pmin} > X_{int'max})) \\ \cap ((Y_{int'min} > Y_{pmax}) \cup (Y_{pmin} > Y_{int'max}))$$ (Formula 8)

The condition indicated by Formula 8 is a sufficient condition to prevent overwrite of image data stored in the image memory area after being shifted (the image data in areas p and q in FIG. 15) on image data stored without being shifted, and overwrite of image data stored after being shifted on unshifted image data stored in the image memory area. In other words, it is a sufficient condition to prevent overlap (overwrite) between image data stored in the image memory without being subjected to coordinate conversion and image data stored after being subjected to coordinate conversion.

Figure 19:
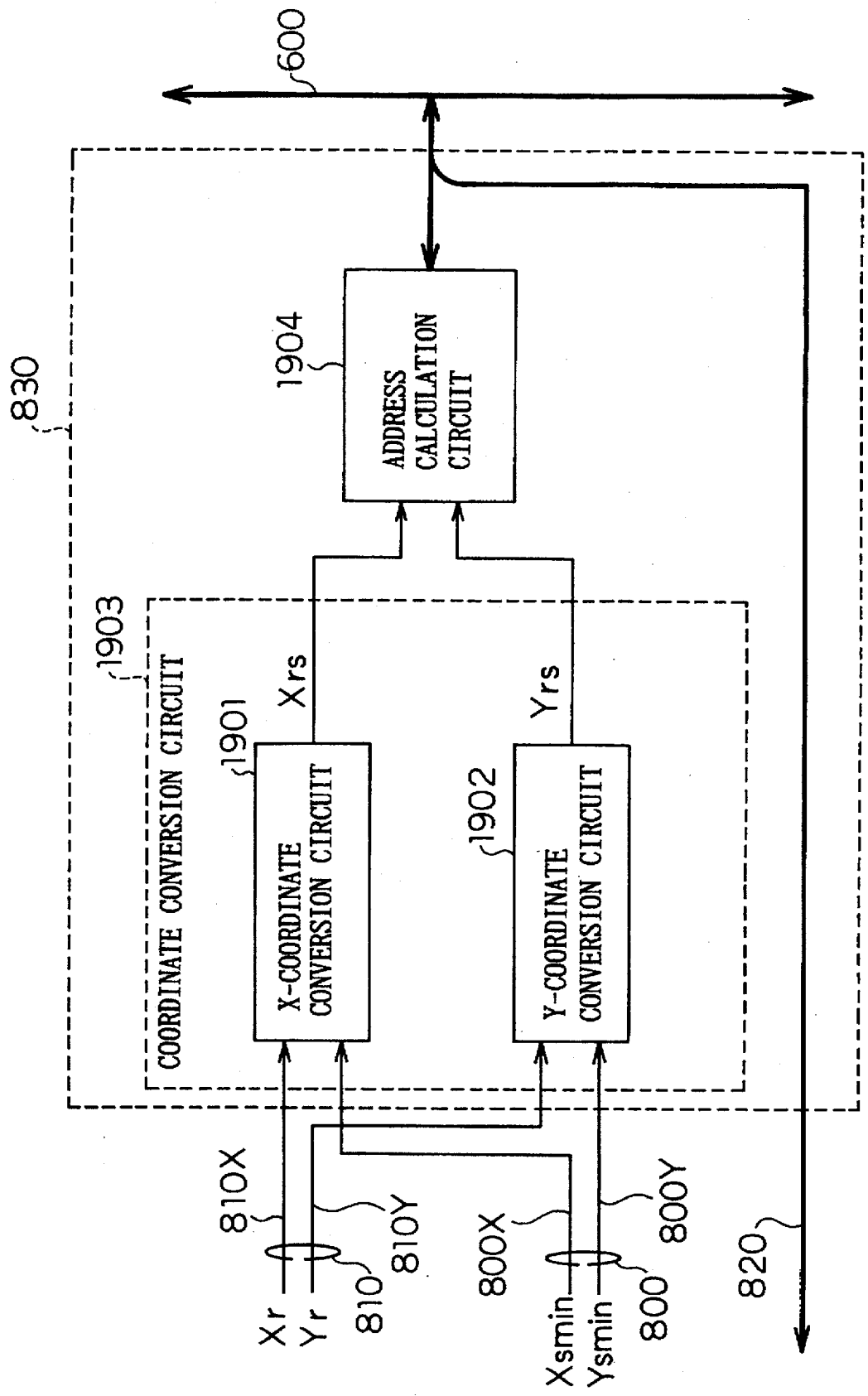
FIG. 19 is a block diagram of a reading circuit 830.

FIG. 19 is a block diagram of the reading circuit 830 (FIG. 5). The circuit block 830 shown in FIG. 19 corresponds to the reading circuit 830. A coordinate conversion circuit 1903 is constituted by an X-coordinate conversion circuit 1901 and a Y-coordinate conversion circuit 1902. The coordinate conversion circuit 1903 converts a read coordinate value 810 (Xr, Yr) whose origin is the address 0 of the image memory into a shift coordinate value (Xu, Yu) whose origin is the coordinate origin O ($X_{smin}$, $Y_{smin}$) of the image memory. An address calculation circuit 1904 calculates an address in the image memory from the above-mentioned shift coordinate value (Xu, Yu). The operation of the address calculation circuit 1904 is the same as the address calculation circuit 543 (FIG. 14). The read data 820 is read from the image memory according to the address in the image memory output by the address calculation circuit.

Figure 20:
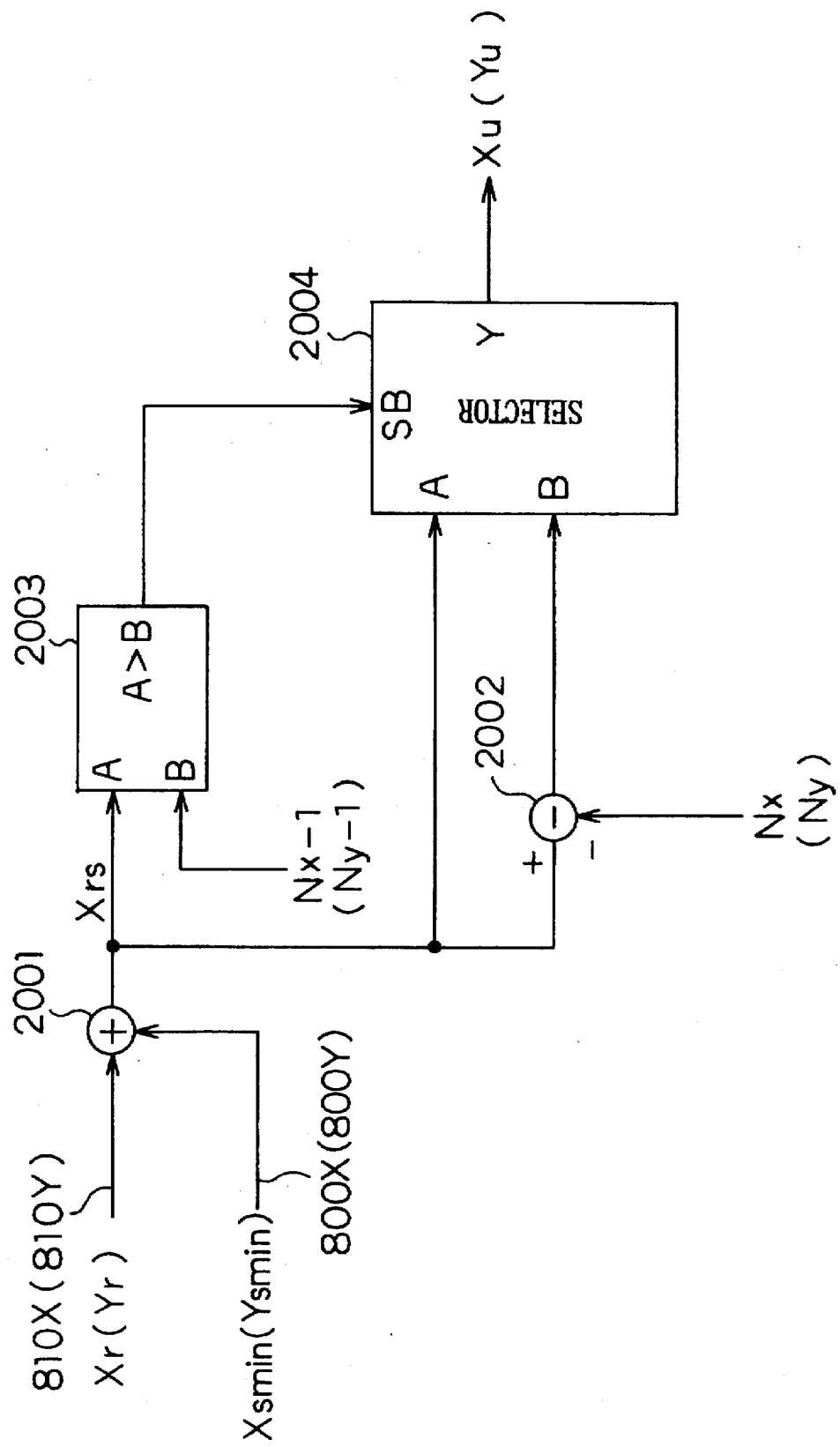
FIG. 20 is a block diagram of a first embodiment of an X-coordinate conversion circuit 1901.

FIG. 20 is a block diagram of a first embodiment of the X-coordinate conversion circuit 1901 (FIG. 19). The X-coordinate conversion circuit 1901 and the Y-coordinate conversion circuit 1902 have the same configuration. FIG. 20 serves as a block diagram of the Y-coordinate conversion circuit 1902 if the signal names, numbers, and values in the brackets are used in FIG. 20.

An adder 2001 adds the X-coordinate value ($X_{smin}$) of the origin O to a read X-coordinate value 810X (Xr) and outputs a shift X-coordinate value Xrs. A comparator 2003 compares the read X-coordinate value Xr with Nx–1 (the maximum coordinate value in the image memory) and outputs at "H" level if Xr is greater than Nx–1. A subtracter 2002 subtracts Nx from the shift X-coordinate value Xrs. A selector 2004 selects the output of the subtracter 2002 when the output of the comparator 2003 is at "H" level. When the shift X-coordinate value Xrs exceeds Nx–1, the X-coordinate conversion circuit 1901 performs conversion so that Nx–1 is not exceeded by shifting Xrs by Nx–1.

Figure 21:
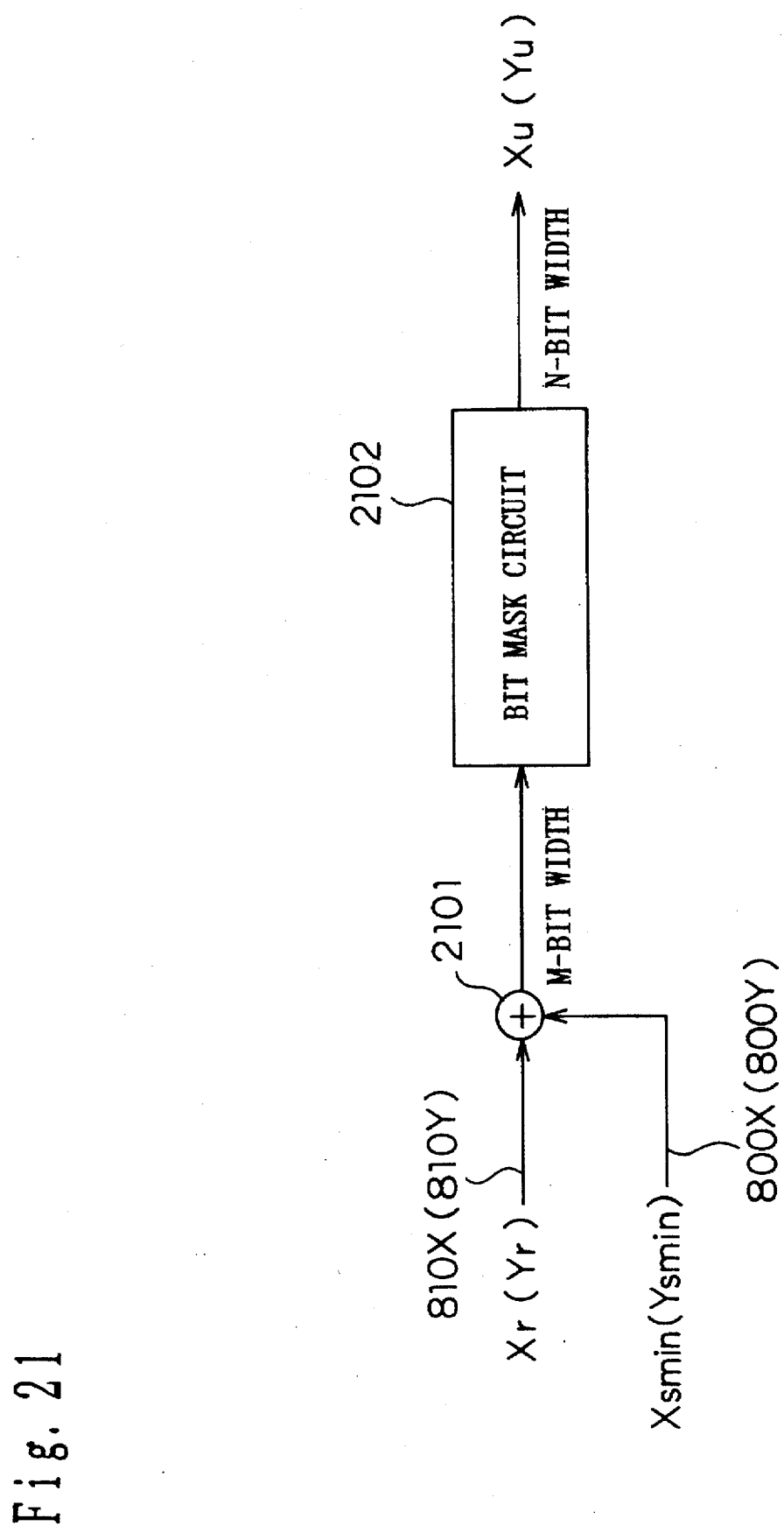
FIG. 21 is a block diagram of a second embodiment of the X-coordinate conversion circuit 1901.

FIG. 21 is a block diagram of a second embodiment of the X-coordinate conversion circuit 1901 (FIG. 19). FIG. 21 serves as a block diagram of the Y-coordinate conversion circuit 1902 if the signal names, numbers, and values in the brackets are used in FIG. 21.

An adder 2101 adds the X-coordinate value ($X_{smin}$) of the origin O to a read X-coordinate value 810X (Xr) and outputs a shift X-coordinate value Xrs. Let us assume that Nx is the N-th power of 2 and that the output of the adder 2101 contains M bits (M>N). A bit mask circuit 2102 outputs N low order bits of the output of the adder 2101. That is, when Nx can be represented by the N-th power of 2, the X-coordinate conversion circuit 1901 shown in FIG. 21 converts the shift X-coordinate value Xrs by Nx–1 if it exceeds Nx–1 to perform conversion so that Nx–1 is not exceeded.

As apparent from the above description, even if storage into the image memory is performed as shown in FIG. 15, the reading circuit 830 (FIG. 5) can reads the image data by automatically performing coordinate conversion (origin shifting). The process carried out by the reading circuit 830 can be also performed on a software basis by referring to the value of the origin coordinate 800.

The operation of the mapping circuit 5 shown in FIG. 6 will now be described. A real number coordinate value 520 and an integral number coordinate value 530 are input to an error calculation circuit 55 (FIG. 6) which in turn outputs a coordinate error 550 which is produced as a result of conversion of the coordinate value 520 into an integral number. Let us assume that Ex represents a coordinate error in the X-direction and that Ey represents a coordinate error in the Y-direction. Then, a coordinate error (Ex, Ey) is calculated using the following Formula 9.

$$Ex = |X_{real} - X_{ini}|$$
$$Ey = |Y_{real} - Y_{ini}|$$ (Formula 9)

where Ex and Ey assume a value in the range from 0 to 0.5.

A comparison circuit 56 compares Ex and Ey of the coordinate error 550 with predetermined values. The comparison circuit 56 outputs a signal 560 which results in "1" if both Ex and Ey are smaller than those values.

An access circuit 57 accesses the image memory 6 via the bus 600. An address in the image memory 6 is specified by the address 540. The high density image signal 500 is stored in the image memory 6 by the access circuit 57 only when the judgement signal 580 is active; the signal 701 is "0"; and the signal 560 is "1". In other words, an address included in the high density image signal 500 is mapped to the image memory 6 only when the address 540 is valid; the pixel is a pixel included in a new scanning area; and the coordinate error is smaller than a predetermined value. A pixel which does not satisfy the above-described condition is not mapped to the image memory 6.

Figure 12:
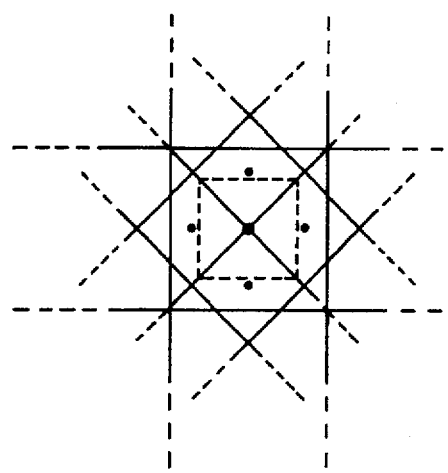
FIG. 12 including
Figure 12:
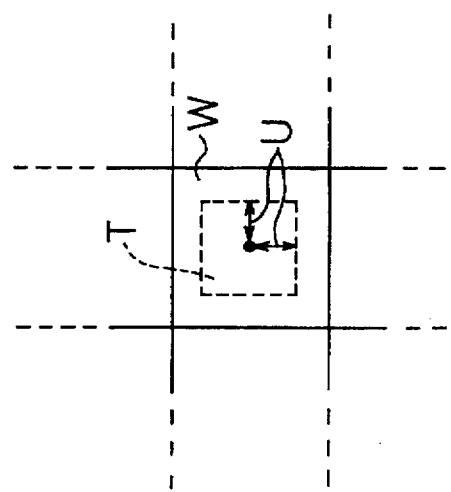
Figure 12:
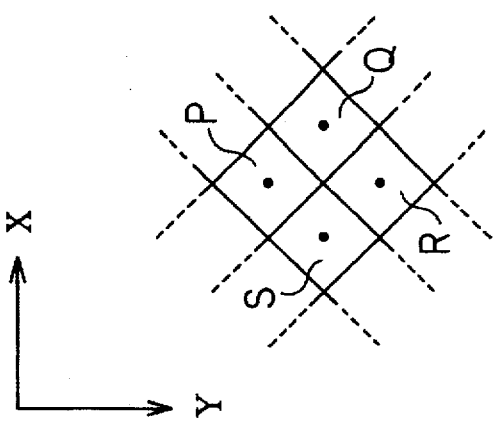

FIG. 12 is a schematic view showing an operation of mapping high density image data 500 to the image memory 6. FIG. 12(a) shows the high density image data 500. In FIG. 12(a), the block dots show the coordinate values of respective pixels. The minimum pixel density of the high density image data 500 is 16 pixel/mm. FIG. 12(b) shows a pixel in the image memory 6. In FIG. 12(b), the black dot shows the coordinate value of a pixel W. A distance U shows a predetermined value used in the comparison circuit 56 of the comparison circuit 4. The image memory 6 stores image data having a pixel density of 8 pixels/mm. FIG. 12(c) shows an example wherein the high density image data 500 (FIG. 12(a)) and the pixel in the image memory (FIG. 12(b)) are stacked up in the same coordinate system. In the case of FIG. 12(c), since the coordinate value of each of pixels P, Q, R, and S in the high density image data is present outside an area T, all the pixels P, Q, R, and S are not mapped to the pixel W in the image memory. In other words, image memory 6 includes pixels which are not mapped (map missing pixels), even though the pixels belong to an original reading area. By expanding the area T, the map missing pixels can be eliminated. However, when the area T is expanded, since a coordinate error during mapping becomes greater, the image mapped to the image memory will have greater distortion. In view of distortion of the image, it is preferable that the area T is as narrow as possible.

The maximum value $U_{max}$ of the distance U for the purpose of eliminating map missing pixels can be expressed by the following Formula 10. In the present embodiment, since the image density of the image memory is 8 pixels/mm, the value is in a unit of ⅛ mm.

$$U_{max} = (\sqrt{2/2})/2 \approx 0.35$$ (Formula 10)

If the distance U is 0.35, map missing pixels can be eliminated. When emphasis is to be placed on reducing distortion of the image by allowing map missing pixels to arise to some degree, the distance U may be set in the range from 0.3 to 0.35. If the distance U is 0.3 or less, map missing pixels occur so frequently that the quality of reproduced image deteriorates significantly.

Figure 8:
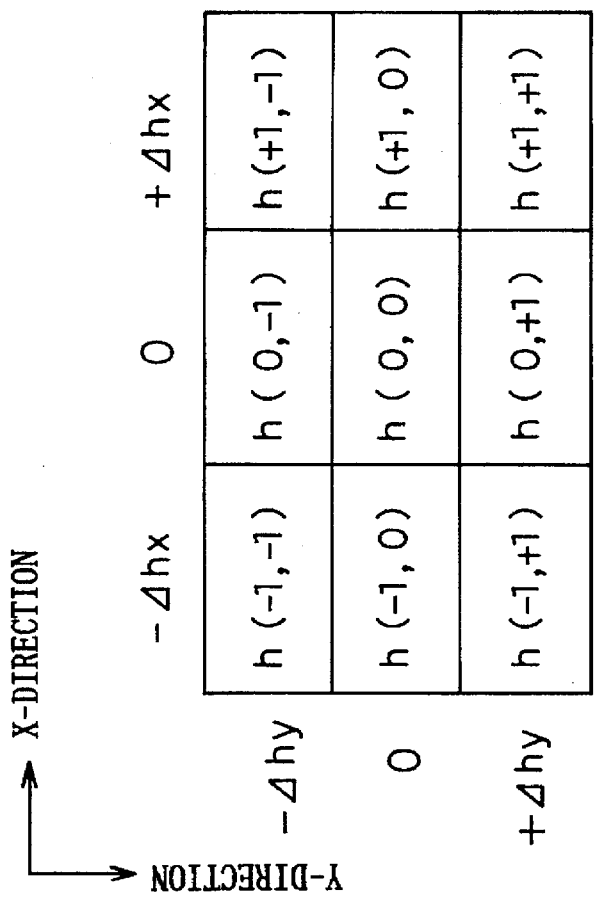
FIG. 8(a) and FIG. 8(b) are schematic views showing correlation table.
Figure 8:
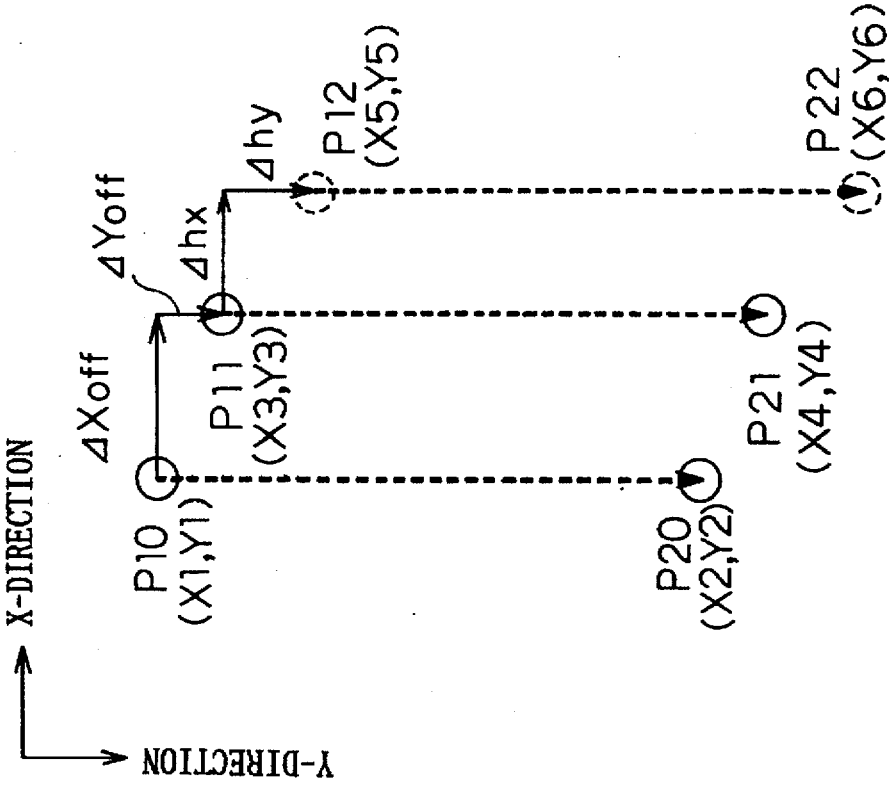

The operation of the position error detection circuit 7 will now be further described. FIG. 8 is a schematic view for explaining a correlation table. An image correlation circuit 72 will be described by mainly referring to FIG. 8. FIG. 8(a) is a schematic view for explaining positions to be correlated, and FIG. 8(b) is a schematic view of a correlation table.

Here, the scanning position coordinate 300 in the i-th line input to the position correction circuit 74 is represented by P10(X1, Y1) and P20(X2, Y2), and the position correction amount 703 is represented by $\Delta Xoffset_i$ and $\Delta Yoffset_i$. The position correction circuit 74 calculates corrected position coordinates P11 (X3, Y3) and P21 (X4, Y4) from the scanning position coordinate 300 according to the following Formula 11

$$X3 = X1 + \Delta Xoffset_i$$
$$Y3 = Y1 + \Delta Yoffset_i$$
$$X4 = X2 + \Delta Xoffset_i$$
$$Y4 = Y2 + \Delta Yoffset_i$$ (Formula 11)

Only when the signal 701 from the overlapping area detection circuit 71 is "1", i.e., when the pixel to be processed is included in the overlapping scanning area, the image correlation circuit 72 calculates a correlation value for the pixel to be processed and updates the correlation table. The calculation of the correlation value is carried out by calculating a differential value between the image data in the image memory corresponding to a coordinate having a micro-value being increased or decreased against the coordinate of the pixel to be processed and the image data of the pixel to be processed.

The coordinate $(Xh_{mn}, Yh_{mn})$ of pixel data Ph subject to calculation of a correlation value of the pixel to be processed is calculated using the following Formula 12 where the coordinate of the pixel to be processed is represented by (Xn, Yn) and micro-coordinate values are represented by $\Delta hx$ and $\Delta hy$.

$$Xh = [Xn + \Delta hx \times m + 0.5]$$
$$Yh = [Yn + \Delta hy \times m + 0.5]$$ (Formula 12)

where m assumes a value of −1, 0, or 1, and n assumes a value of −1, 0, or 1. Furthermore, [ ] represents an operation of rounding off below decimals.

In FIG. 8(a), P12 to P22 indicate positions of one line for which a correlation value is calculated with m=1 and n=1. Let us assume that h(m, n) represents a correlation table corresponding to the coordinate for which a correlation value is to be calculated. Then, a correlation table as shown in FIG. 8(b) can be created.

The value h(m, n) of each correlation table is calculated using the following Formula 13 where j represents a pixel number in one line of the high density image signal 500; $Dn_j$ represents a data value; and $Dh_{jmn}$ represents pixel data for which a correlation value is to be calculated in the image memory 6. Here, ho (m, n) represents the value of a correlation table which has been created as a result of correlation value calculation up to the pixel number j−1. Before the correlation value calculation of one line starts, values in the correlation table are all initialized to "0".

$$h(m, n) = ho(m, n) + |Dn_j - Dh_{jmn}|$$ (Formula 13)

The image correlation circuit 72 conducts the above-described correlation value calculation on all the pixels in one line in the high density image signal to complete a correlation table.

Further, at the time when the calculation of the correlation value for one line is finished, the image correlation circuit 72 retrieves $(m_{min}, n_{min})$ which holds the minimum value of h(m, n) and outputs it as an offset value 702. When there are a plurality of minimum values including $(m_{min}, n_{min})$ in the correlation table, the minimum value (0, 0) is used with priority. The fact that a correlation value $h(m_{min}, n_{min})$ is the smallest on the correlation table indicates that an image in the image memory and the images of a line to be mapped next correspond to each other most suitably when a micro-value of ($\Delta hx \times m_{min}$, $\Delta hy \times n_{min}$) is added to the coordinate of each pixel.

The correction amount calculation circuit 73 performs an operation shown as the following Formula 14 using the offset value 702 ($m_{min}$, $n_{min}$).

$$Xoffset_i = \Delta Xoffset i - 1 + \Delta hx \times m_{min}$$
$$Yoffset_i = \Delta Yoffset i - 1 + \Delta hy \times n_{min}$$
(Formula 14)

In Formula 14, a suffix i indicates the position correction amount 703 at the time when the correlation table in the i-th line of the high density image data 500 is completed. The position correction circuit 74 corrects the scanning position coordinate 300 by adding ($\Delta Xoffset_i$, $\Delta Xoffset$) and outputs the corrected position coordinate 710.

Although there are nine pixel positions to be subjected to correlation in the present embodiment, if there is a great amount of position error, the pixel positions to be correlated may be increased. If the amount of the position error is small and there is no need for detecting and correcting position errors for each line, position error correction may be performed in very 17th scan line instead of creating a correlation table for each line.

Figure 9:
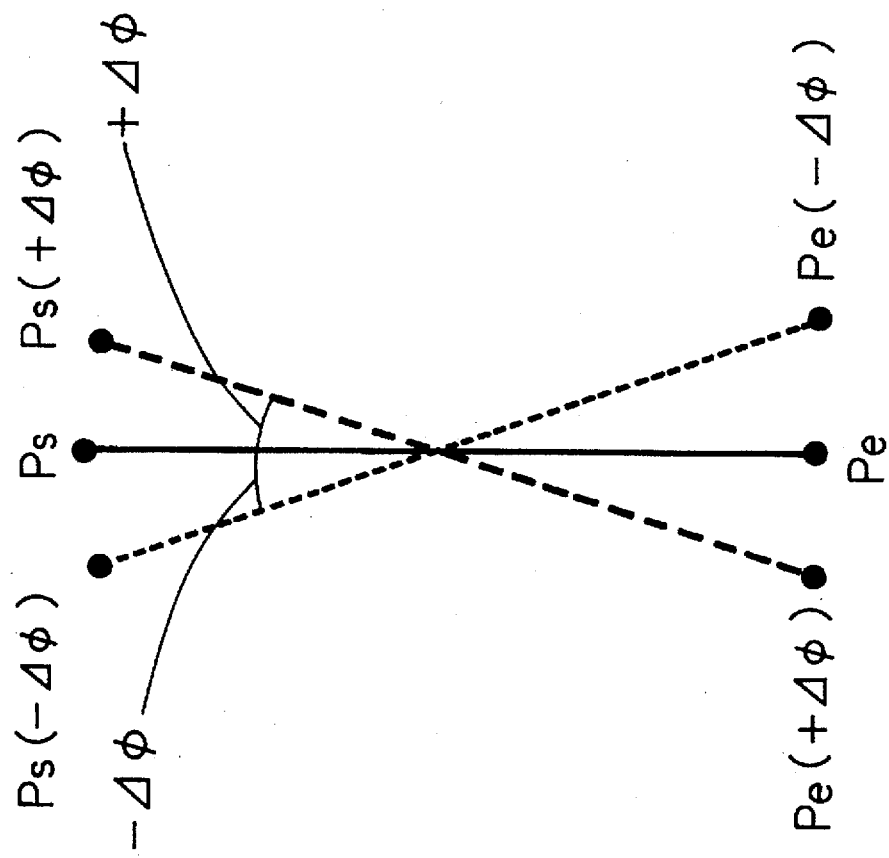
FIG. 9 is a schematic view showing angle correction.

As shown in FIG. 9, the image correlation circuit 72 can improve the accuracy of position error correction by performing a correlation process on a correlation coordinate Ps($\pm\Delta\phi$)–Pe($\pm\Delta\phi$) at an inclination of a micro-angle $\Delta\phi$ from the scanning position coordinate Ps–Pe. In this case, when this is combined with a correlation table value h(m, n) in the present embodiment, the correlation table value becomes (1, m, n). Here, 1 has a value selected from −1, o, and 1. This makes it possible to create a correlation table comprising three patterns in the angle direction and nine patterns in the position direction which result in a total of 27 patterns. When the minimum value of the correlation table is (1, m, n), a correction amount of angle $\Delta\phi offset_i$ is generated by performing a calculation of 1·$\Delta\phi$. Here, $\Delta\phi$ is 0.2 degrees.

Although the input image data and scanning position coordinate are input from a hand-held scanner having two rotary encoders in the present embodiment, they may be input from a hand-held scanner of a type which obtains the scanning position coordinate by means of position detection using a tablet. Further, although an image processing apparatus which processes a signal from a hand-held scanner utilizing a line image sensor has been described in the present embodiment, the present invention is not limited to such a hand-held scanner. For example, it may be an apparatus which processing an image signal from an image input apparatus utilizing an area image sensor.

The same process as in the present embodiment may be implemented on a software basis in a system utilizing a microcomputer and a DSP (digital signal processor).

In the above-described embodiment, when a first determination means according to the present invention determines that a coordinate value $X_{int}$ is out of a first coordinate range, the coordinate value is shifted by a value Nx so that it comes in the first coordinate range. However, the present invention is not limited thereto and, for example, the above-mentioned coordinate value which has been determined as being out of the coordinate range may be shifted to any place as long as it will be in the coordinate range.

What is claimed is:

1. An image processing apparatus to which image data read by scanning an original image and scanning position data corresponding to said image data is input and which stores said image data in a page memory having a size of Nx pixels in an X-direction and Ny pixels in a Y-direction comprising:

a means for calculating a coordinate value of each pixel in said image data in the coordinate system of said original;

a conversion means for converting said calculated coordinate value into a coordinate value ($X_{int}$, $Y_{int}$) on a pixel-by-pixel basis in said page memory;

a first determination means for determining whether said coordinate value $X_{int}$ is within a first coordinate range $0 \leq X < Nx$ which can be stored in said page memory;

a second determination means for determining whether said coordinate value $Y_{int}$ is within a second coordinate range $0 \leq Y < Ny$ which can be stored in said page memory;

an X-coordinate conversion means for shifting said coordinate value $X_{int}$ so that said coordinate value $X_{int}$ will come in said first coordinate range and for outputting the shifted coordinate value as Xp if said first determination means determines that said coordinate value $X_{int}$ is out of said first coordinate range and for outputting said coordinate value $X_{int}$ without shifting as $X_{int}$ if said first determination means determines that said coordinate value $X_{int}$ is within said first coordinate range; and a Y-coordinate conversion means for shifting said coordinate value $Y_{int}$ so that it will come in said second coordinate range and for outputting the shifted coordinate value as Yp if said second determination means determines that said coordinate value $Y_{int}$ is out of said second coordinate range and for outputting said coordinate value $Y_{int}$ without shifting as $Y_{int}$ if said second determination means determines that said coordinate value $Y_{int}$ is within said second coordinate range.

2. The image processing apparatus according to claim 1, wherein the shifting into said first coordinate range is shifting by a value of Nx and the shifting into said second coordinate range is shifting by a value of Ny.

3. The image processing apparatus according to claim 2, said X-coordinate conversion means comprising:

an addition means for adding said number of pixels Nx to said coordinate value $X_{int}$ when said coordinate value $X_{int}$ on a pixel-by-pixel basis is a negative value; and a subtraction means for subtracting said number of pixels Nx from said coordinate value $X_{int}$ when said coordinate value $X_{int}$ on a pixel-by-pixel basis exceeds a maximum coordinate value Nx−1 of the page memory, and said Y-coordinate conversion means comprising:

an addition means for adding said number of pixels Ny to said coordinate value $Y_{int}$ when said coordinate value $Y_{int}$ on a pixel-by-pixel basis is a negative value; and a subtraction means for subtracting said number of pixels Ny from said coordinate value $Y_{int}$ when said coordinate value $Y_{int}$ on a pixel-by-pixel basis exceeds a maximum coordinate value Ny−1 of the page memory.

4. The image processing apparatus according to claim 2, said X-coordinate conversion means comprising:

a bit mask means for masking a single or a plurality of high order bits of said coordinate value $X_{int}$ when Nx is a power of 2.

5. The image processing apparatus according to claim 2, said Y-coordinate conversion means comprising:

a bit mask means for masking a single or a plurality of high order bits of said coordinate value $Y_{int}$ when Ny is a power of 2.

6. The image processing apparatus according to claim 1, further comprising:
    a determination means for determining whether coordinate values output by said X-coordinate conversion means and said Y-coordinate conversion means are valid or invalid, wherein
said image data is not stored in the page memory if said determination means determines as invalid.

7. The image processing apparatus according to claim 6, said determination means comprising:
    an overlap detection means for detecting whether or not the area of said page memory in which said coordinate value (Xp, Yp), (Xp, $Y_{int}$), or ($X_{int}$, Yp) output by the X-coordinate conversion means and Y-coordinate conversion means is stored overlaps with the area of said page memory in which said coordinate value ($X_{int}$, $Y_{int}$) is stored, wherein
    said coordinate value output by the X-coordinate conversion means and Y-coordinate conversion means is determined as valid if said overlap detection means detects no overlap and, otherwise, said coordinate value is determined as invalid.

8. The image processing apparatus according to claim 7, said overlap detection means comprising:
    a register for holding a maximum value ($X_{int'max}$) and a minimum value ($X_{int'min}$) of said X-coordinate value $X_{int}$;
    a register for holding a maximum value ($Y_{int'max}$) and a minimum value ($Y_{int'min}$) of said Y-coordinate value $Y_{int}$;
    a register for holding a maximum value ($Xp_{max}$) and a minimum value ($Xp_{min}$) of said X-coordinate value Xp;
    a register for holding a maximum value ($Yp_{max}$) and a minimum value ($Yp_{min}$) of said Y-coordinate value Yp; and
    a comparison means for respectively comparing said $X_{int'min}$ and $Xp_{max}$, $Y_{int'min}$ and $Yp_{max}$, $X_{int'max}$ and $Xp_{min}$, and $Y_{int'max}$ and $Yp_{min}$, wherein
said determination of absence of overlap is made when a condition "($X_{int'min}$>$Xp_{max}$ or $X_{int'max}$<$Xp_{min}$) and ($Y_{int'max}$<$Yp_{min}$ or $Y_{int'min}$>$Yp_{max}$)" is satisfied.

9. The image processing apparatus according to claim 6, said X-coordinate conversion means comprising:
    an addition means for adding said number of pixels Nx to said coordinate value $X_{int}$ when said coordinate value $X_{int}$ on a pixel-by-pixel basis is a negative value; and
    a subtraction means for subtracting said number of pixels Nx from said coordinate value $X_{int}$ when said coordinate value $X_{int}$ on a pixel-by-pixel basis exceeds a maximum coordinate value Nx−1 of the page memory, and
said Y-coordinate conversion means comprising:
    an addition means for adding said number of pixels Ny to said coordinate value $Y_{int}$ when said coordinate value $Y_{int}$ on a pixel-by-pixel basis is a negative value; and
    a subtraction means for subtracting said number of pixels Ny from said coordinate value $Y_{int}$ when said coordinate value $Y_{int}$ on a pixel-by-pixel basis exceeds a maximum coordinate value Ny−1 of the page memory.

10. The image processing apparatus according to claim 6, said X-coordinate conversion means comprising:
    a bit mask means for masking a single or a plurality of high order bits of said coordinate value $X_{int}$ when Nx is a power of 2.

11. The image processing apparatus according to claim 6, said Y-coordinate conversion means comprising:
    a bit mask means for masking a single or a plurality of high order bits of said coordinate value $Y_{int}$ when Ny is a power of 2.

12. An image processing apparatus to which image data read by scanning an original image and scanning position data corresponding to said image data is input, which stores said image data in a page memory having a size of Nx pixels in an X-direction and Ny pixels in a Y-direction, and which reads out the image data stored in the page memory comprising:
    a means for calculating a coordinate value of each pixel in said image data in the coordinate system of said original;
    a conversion means for converting said calculated coordinate value into a coordinate value ($X_{int}$, $Y_{int}$) on a pixel-by-pixel basis in said page memory;
    a first determination means for determining whether said coordinate value $X_{int}$ is within a first coordinate range 0≦X<Nx which can be stored in said page memory;
    a second determination means for determining whether said coordinate value $Y_{int}$ is within a second coordinate range 0≦Y<Ny which can be stored in said page memory;
    an X-coordinate conversion means for shifting said coordinate value $X_{int}$ so that it will come in said first coordinate range and for outputting the shifted coordinate value as Xp if said first determination means determines that said coordinate value $X_{int}$ is out of said first coordinate range and for outputting said coordinate value $X_{int}$ without shifting as $X_{int}$ if said first determination means determines that said coordinate value $X_{int}$ is within said first coordinate range;
    a Y-coordinate conversion means for shifting said coordinate value $Y_{int}$ so that said coordinate value $Y_{int}$ will come in said second coordinate range and for outputting the shifted coordinate value as Yp if said second determination means determines that said coordinate value $Y_{int}$ is out of said second coordinate range and for outputting said coordinate value $Y_{int}$ without shifting as $Y_{int}$ if said second determination means determines that said coordinate value $Y_{int}$ is within said second coordinate range;
    a register for holding a minimum value $X_{smin}$ of said coordinate value Xp when said coordinate value $X_{int}$ is a negative value;
    a register for holding a minimum value $Y_{smin}$ of said coordinate value Yp when said coordinate value $Y_{int}$ is a negative value; and
    a coordinate conversion means for shifting a read coordinate value (Xr, Yr) specified for readout from said page memory by said minimum value ($X_{smin}$, $Y_{smin}$) and converts said read coordinate value (Xr, Yr) into a coordinate value (Xu, Yu) in said page memory.

13. The image processing apparatus according to claim 12, wherein the shifting into said first coordinate range is shifting by a value of Nx and the shifting into said second coordinate range is shifting by a value of Ny.

14. Image processing apparatus according to claim 10, said X-coordinate conversion means comprising:
    an addition means for adding said number of pixels Nx to said coordinate value $X_{int}$ when said coordinate value $X_{int}$ on a pixel-by-pixel basis is a negative value; and
    a subtraction means for subtracting said number of pixels Nx from said coordinate value $X_{int}$ when said coordinate value $X_{int}$ on a pixel-by-pixel basis exceeds a maximum coordinate value Nx−1 of a page memory, and said Y-coordinate conversion means comprising:

an addition means for adding said number of pixels Ny to said coordinate value $Y_{int}$ when said coordinate value $Y_{int}$ on a pixel-by-pixel basis is a negative value; and a subtraction means for subtracting said number of pixels Ny from said coordinate value $Y_{int}$ when said coordinate value $Y_{int}$ on a pixel-by-pixel basis exceeds a maximum coordinate value Ny−1 of a page memory.

15. The image processing apparatus according to claim 13, said X-coordinate conversion means comprising:

a bit mask means for masking a single or a plurality of high order bits of said coordinate value $X_{int}$ when Nx is a power of 2.

16. The image processing apparatus according to claim 13, said Y-coordinate conversion means comprising:

a bit mask means for masking a predetermined significant bit of said coordinate value $Y_{int}$ when Ny is a power of 2.

17. The image processing apparatus according to claim 12, said coordinate conversion means comprising:

an addition means for adding said minimum value ($X_{smin}$, $Y_{smin}$) to said read coordinate value (Xr, Yr) and for outputting a shift coordinate value (Xrs, Yrs);

a subtraction means for subtracting said number of pixels Nx from said shift coordinate value Xrs and for outputting said coordinate value Xu when said shift coordinate value Xrs exceeds a maximum coordinate value Nx−1 of said page memory; and a subtraction means for subtracting said number of pixels Ny from said shift coordinate value Yrs and for outputting said coordinate value Yu when said shift coordinate value Yrs exceeds a maximum coordinate value Ny−1 of said page memory.

18. The image processing apparatus according to claim 12, said coordinate conversion means comprising:

an addition means for adding said minimum value $X_{smin}$ said read coordinate value Xr and for outputting a shift coordinate value Xrs; and a bit mask means for masking a single or a plurality of high order bits of said shift coordinate value Xrs and for outputting said coordinate value Xu, where said Nx can be represented by a power of 2.

19. The image processing apparatus according to claim 12, said coordinate conversion means comprising:

an addition means for adding said minimum value $Y_{smin}$ to said read coordinate value Yr and for outputting a shift coordinate value Yrs; and a bit mask means for masking a single or a plurality of high order bits of said shift coordinate value Yrs and for outputting said coordinate value Yu, where said Ny can be represented by a power of 2.

* * * * *